(12) United States Patent
James

(10) Patent No.: US 11,412,079 B1
(45) Date of Patent: Aug. 9, 2022

(54) POUCH OR POCKET FOR ATTACHMENT TO A CELL PHONE

(71) Applicant: Marisa A. James, Spring, TX (US)

(72) Inventor: Marisa A. James, Spring, TX (US)

(*) Notice: Subject to any disclaimer, the term of this patent is extended or adjusted under 35 U.S.C. 154(b) by 0 days.

(21) Appl. No.: 16/442,431

(22) Filed: Jun. 14, 2019

Related U.S. Application Data

(60) Provisional application No. 62/684,744, filed on Jun. 14, 2018.

(51) Int. Cl.
| | | |
|---|---|---|
| *H04M 1/215* | (2006.01) | |
| *H04M 1/03* | (2006.01) | |
| *A45C 13/10* | (2006.01) | |
| *H04B 1/3888* | (2015.01) | |
| *A45C 11/18* | (2006.01) | |
| *A45C 11/00* | (2006.01) | |

(52) U.S. Cl.
CPC .......... *H04M 1/215* (2013.01); *A45C 11/182* (2013.01); *A45C 13/1092* (2013.01); *H04B 1/3888* (2013.01); *A45C 2011/002* (2013.01)

(58) Field of Classification Search
None
See application file for complete search history.

(56) References Cited

U.S. PATENT DOCUMENTS

| | | | | | |
|---|---|---|---|---|---|
| D688,655 | S | * | 8/2013 | Rey-Hipolito | H04B 1/3888 |
| | | | | | D14/250 |
| 8,573,458 | B1 | * | 11/2013 | Hamilton | A45F 5/021 |
| | | | | | 224/250 |
| D716,045 | S | * | 10/2014 | Requa | D3/249 |
| 9,277,804 | B1 | * | 3/2016 | Gennodie | A45C 1/02 |
| 9,407,743 | B1 | * | 8/2016 | Hirshberg | H04M 1/04 |
| D827,629 | S | * | 9/2018 | Yu | B32B 7/12 |
| | | | | | D14/250 |
| 2007/0254129 | A1 | * | 11/2007 | Horblitt | B32B 7/12 |
| | | | | | 428/42.3 |
| 2010/0122439 | A1 | * | 5/2010 | Britton | H04B 1/3888 |
| | | | | | 24/306 |
| 2011/0089078 | A1 | * | 4/2011 | Ziemba | A45C 1/04 |
| | | | | | 206/570 |
| 2014/0091116 | A1 | * | 4/2014 | Yu | A45F 5/00 |
| | | | | | 224/218 |
| 2014/0202886 | A1 | * | 7/2014 | Kim | A45F 5/00 |
| | | | | | 206/38 |
| 2014/0361062 | A1 | * | 12/2014 | Newton | A45F 5/02 |
| | | | | | 224/674 |
| 2017/0195469 | A1 | * | 7/2017 | Duckett | H04M 1/04 |
| 2018/0316380 | A1 | * | 11/2018 | Buffin | H04B 1/3888 |
| 2019/0223580 | A1 | * | 7/2019 | Wasylko | F41C 33/048 |

* cited by examiner

*Primary Examiner* — Quoc D Tran
(74) *Attorney, Agent, or Firm* — Karen B. Tripp

(57) ABSTRACT

A pouch for removable attachment to a mobile phone case that affords easier holding of the phone case by the user as well as secure holding of personal items in the pouch. The pouch does not interfere with use of the phone camera or with mounting the phone on a charger or car mount. A strap with fasteners such as snaps or fasteners directly attached to the case hold the pouch to the case.

4 Claims, 26 Drawing Sheets

US 11,412,079 B1

POUCH OR POCKET FOR ATTACHMENT TO A CELL PHONE

RELATED APPLICATION

The present application claims priority from and incorporates by reference in its entirety U.S. Provisional Patent Application No. 62/684,744, filed Jun. 14, 2018.

BACKGROUND OF THE INVENTION

Field of the Invention

The present invention relates to mobile phone case pockets and add-on personal item holders for attachment to mobile phone cases.

Description of Relevant Art

Students and workers often want and need to move about their schools and workplaces carrying with them their mobile phones and some personal items such as money or identification in an efficient and unencumbering or "hands free" manner. Often workers don't have lockers to keep personal items while at work and it is always nice to have change for vending machines throughout the day. Many cases and holders exist for carrying mobile phones and similar electronic devices and there is an ongoing desire to carry such devices without encumbrances such as bags and purses. The large variety in such cases and holders reflects the large variety of needs the cases and holders are trying to meet and the advantages and disadvantages the various cases and holders afford in their solutions.

There continues to be a need for a protective case for a mobile phone that enables one-hand operation and wireless charging and car mounting with ease. There is also an ongoing need for making mobile phones easier to hold. The present invention addresses and meets these needs, while including some benefits that have come to be expected, such as providing a secure pocket or holder for personal items.

SUMMARY OF THE INVENTION

In one embodiment, the present invention provides an attachable and removable pouch, for use on a mobile phone case. The pouch fits on the case between the camera window of the case near the top of the back of the case and a cutout near the bottom of the case for access to a phone's charging port. The pouch holds personal items, such as credit cards, identification cards, money and/or keys. The pouch also can be used to support or prop the phone in an upright or quasi- or semi-upright position on a flat surface. The pouch does not interfere with mounting the phone in the case on a car mount or wireless charger. The pouch also is useful for supporting a person's hand or fingers while holding or using the phone, effectively enhancing the person's grip of the phone case or simply just making the phone easier and more comfortable to hold.

The pouch has a main or pouch body comprising a first piece and a second piece of fabric sewn to a first connector such as a zipper to make the front of the pouch and a third piece of fabric sewn to the first piece and the second piece of fabric to form with the first and second pieces of fabric a generally rectangular shaped body sized in depth or otherwise sufficiently flexible to hold at least two credit cards and in height and width to be smaller than the height and width of the phone case.

A second connector is positioned on the back and near the top of the pouch body and a third connector is positioned on the back and near the bottom of the pouch body. These two connectors are spaced apart on the pouch body at a distance of at least about the width of two to four fingers of an adult's hand.

A ribbon or ribbon-type strap can be used in one embodiment to hold the pouch to the mobile phone case. The strap is about ⅜ inch to about 1 inch in width and sufficiently long to extend along the back of the inside of the phone case from the camera window to the cutout so that one end of the strap can extend out the camera window to the exterior of the back of the phone case and the other end of the strap can extend out the cutout to the exterior of the back of the phone case. The ends of the strap have female snaps or the loop part of hoop and loop connectors.

A second ribbon type extender strap can be used to add length to the first strap to accommodate different sized mobile phone cases. Further, such extender can make the space between the pouch and the mobile phone case larger to accommodate larger fingers and a larger hand positioning in such space for better holding the phone.

While snaps are favorably used as connectors in the present invention, other connectors can alternatively be used. Hook and loop fasteners are good substitutes. Other substitutes include ties, buttons, and hooks, for non-limiting example.

In another alternative embodiment of the invention, fasteners are attached directly to the mobile phone case body to correspond and connect with fasteners on the pouch body, eliminating the need for a strap.

In still another embodiment of the invention, a kit is provided having the pouch and the strap with fasteners and optional extenders for use in adapting an existing mobile phone case for use according to the present invention.

BRIEF DESCRIPTION OF THE DRAWINGS

The drawings below show embodiments of the invention in various aspects and some uses of the invention.

DETAILED DESCRIPTION OF PREFERRED EMBODIMENTS OF THE INVENTION

Figure 1:
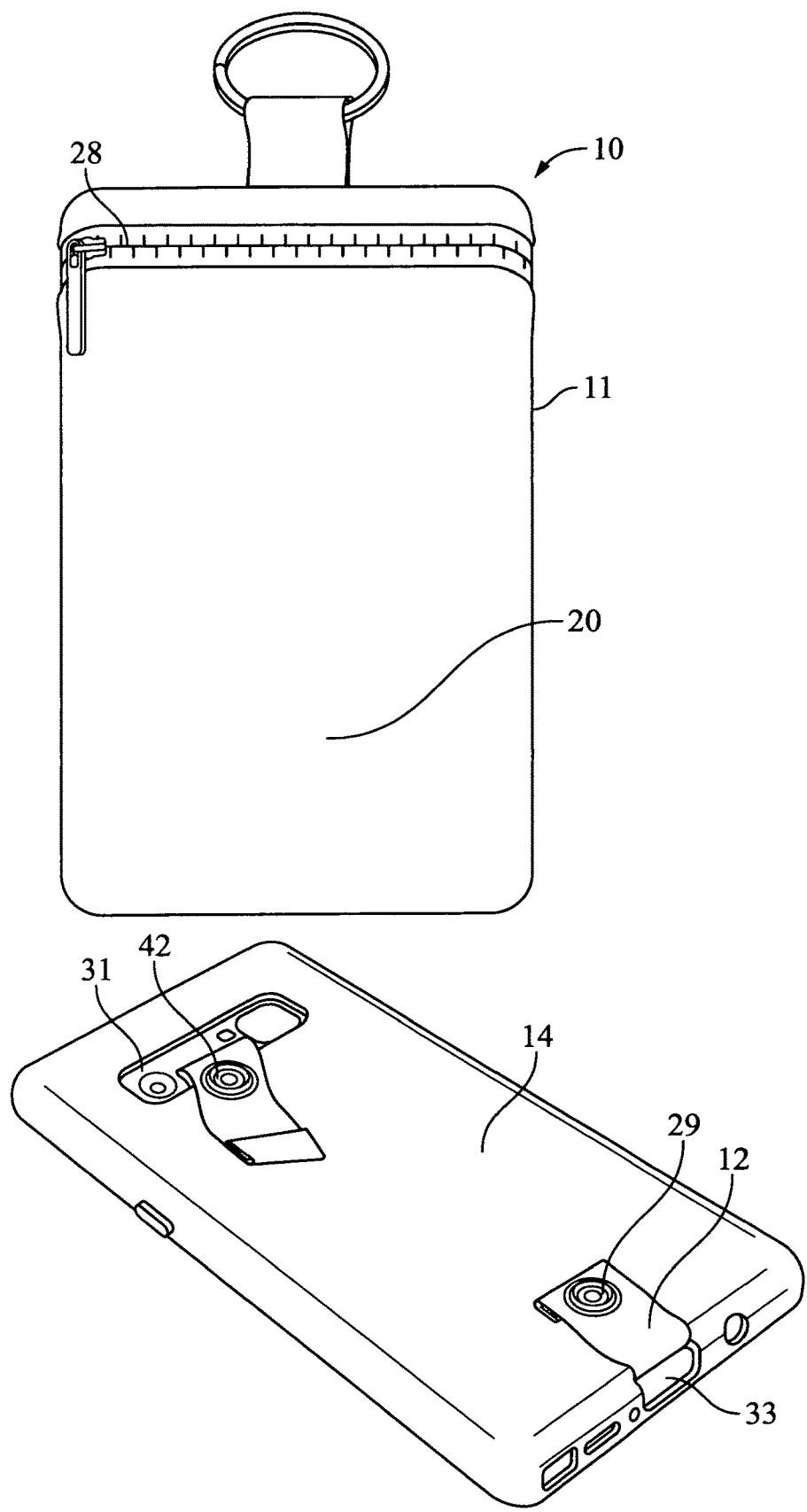
FIG. 1 shows a mobile phone case and pouch of one embodiment of the invention, from a front perspective view, with the pouch detached from the phone case.
Figure 2:
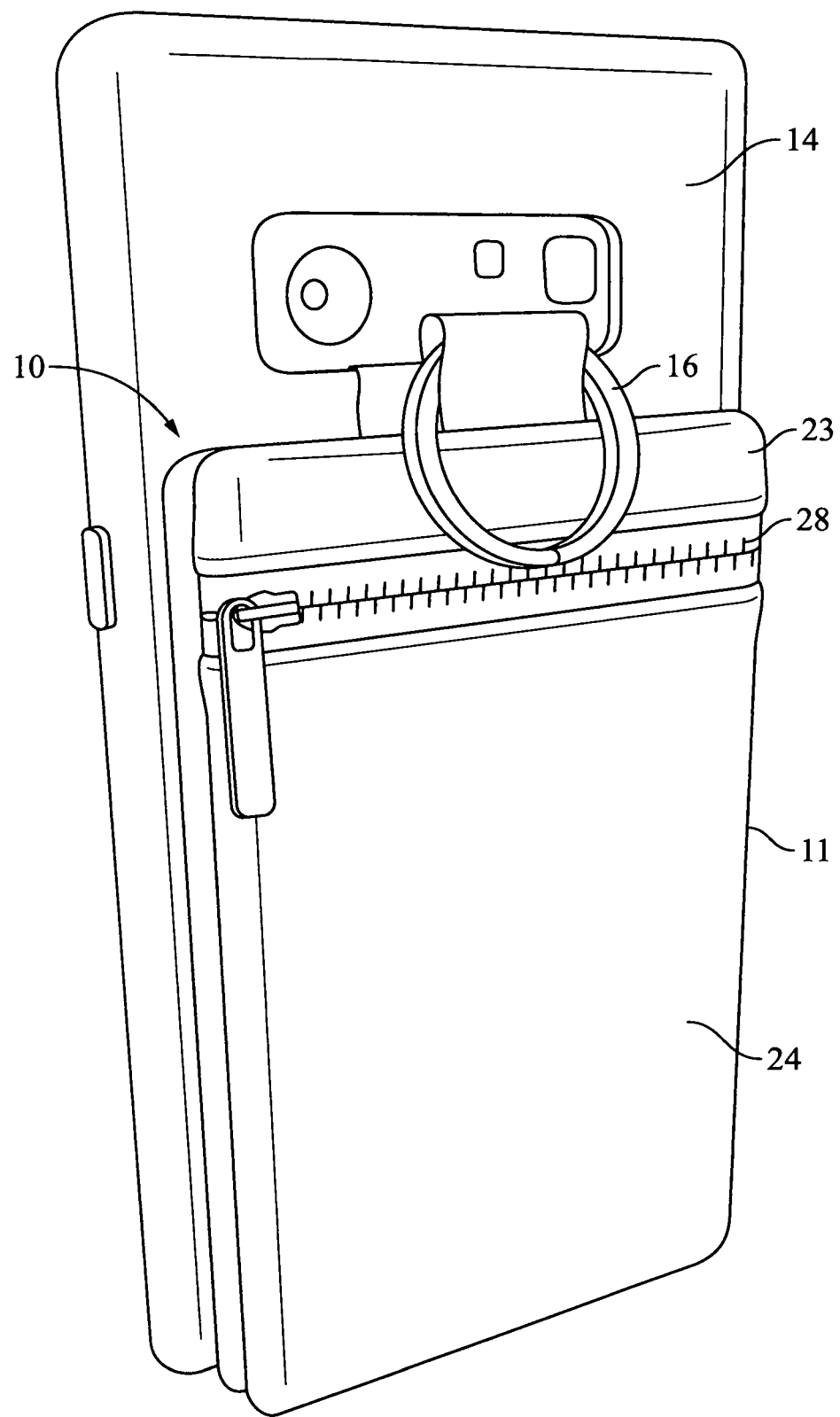
FIG. 2 shows a pouch of the embodiment of the invention of FIG. 1 with the pouch attached to the mobile phone case in a frontal view.
Figure 3:
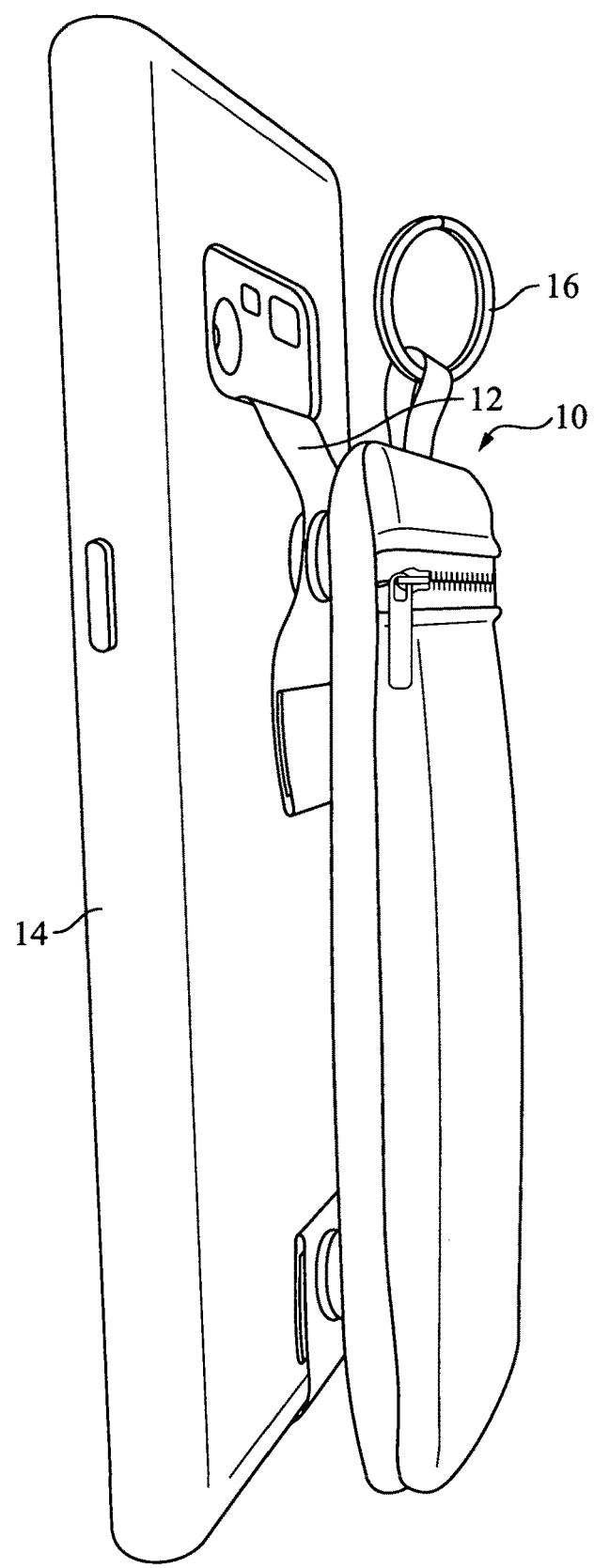
FIG. 3 shows a side perspective view of the embodiment of the invention of FIG. 1 with the pouch 11 removably attached to the phone case. An optional ring is shown being held upward, as it might be used for hanging the pouch and phone case with phone.

The present invention provides a mobile phone case and wallet combination that provides a safer way to hold or prop a mobile phone, to carry identification (ID) cards, credit cards, bills, and loose change simultaneously, and to use mobile phone accessories, such as a wireless charger and car mount, without decreasing or compromising the primary safety utility of the mobile phone case.

The present invention enhances a mobile phone case, improving its ability to securely carry personal items such as multiple (at least two) credit cards, a driver's license or other identification card, and bills and loose change, without such items falling out, while avoiding obstructing the charging or mounting of the phone while in the case, and still further enhancing the grip of the user holding the phone. The invention also enables a phone in its case to be attached to a lanyard and tucked under a shirt.

The present invention is useful with various sizes and name brands of mobile phones, because the pouch of the invention fits many different shapes and sizes of phones. The pouch is multifunctional, is easy to hold, has a zipper closure in one embodiment that allows for loose change to be easily carried, and expands enough to hold multiple cards and cash at the same time.

One embodiment of the invention holds the pouch of the invention to the mobile phone case with a strap. That strap is multifunctional also. With the strap of the pouch, a hand can fit between the pouch and the phone with the phone resting on the hand without the need for the user to grip tightly. The strap has a quick release function to keep the pouch attached to the phone while simultaneously wirelessly charging the phone or using the phone positioned on a car phone mount. The pouch can also be customized to include a keyring or stand.

Referring to the drawings for illustration of the invention, the present invention provides a pouch 10 for a mobile phone case 14 that adds utility to the phone case 14, allowing the case to carry personal items such as bills and coins, keys, credit cards, and/or a photo identification card or driver's license.

Figure 19:
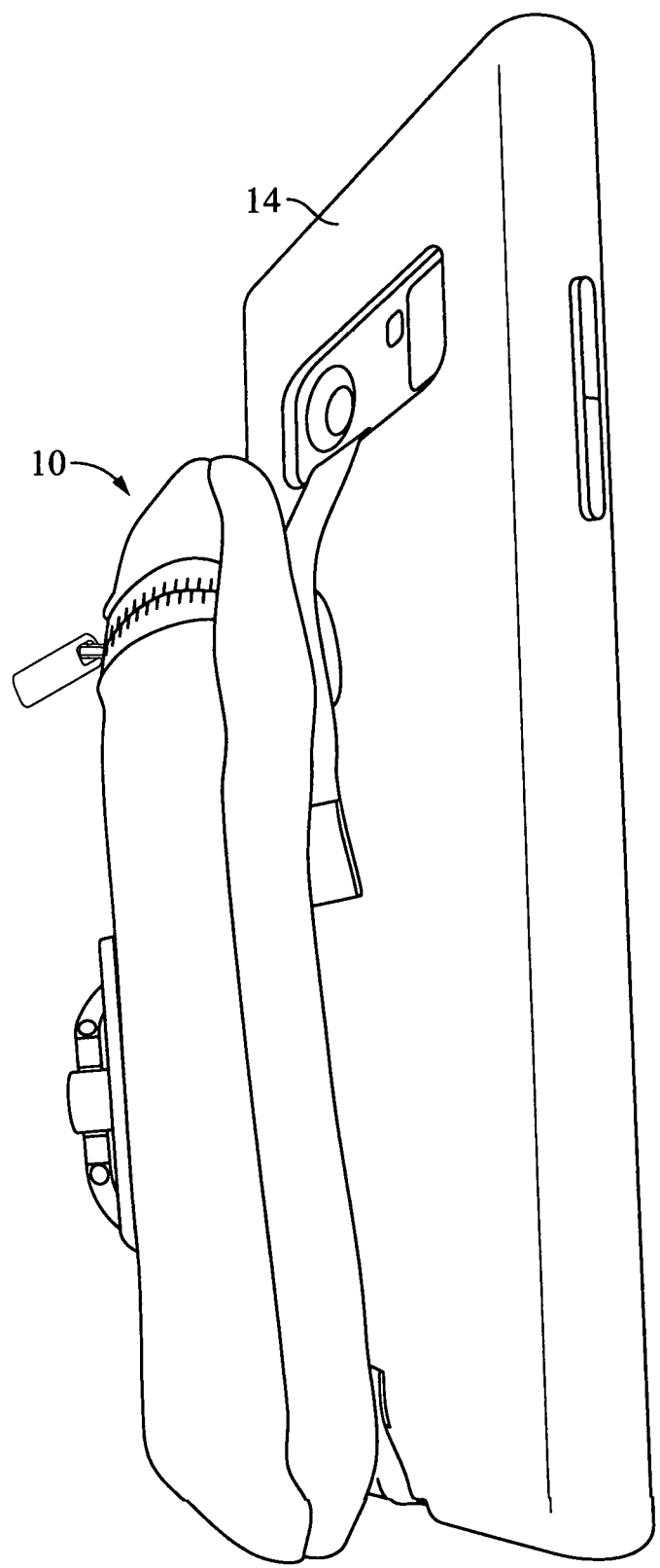
FIG. 19 is another back perspective view of the embodiment of the invention, showing how the pouch of the invention when attached to the phone does not interfere with or cover the camera of the phone.
Figure 20:
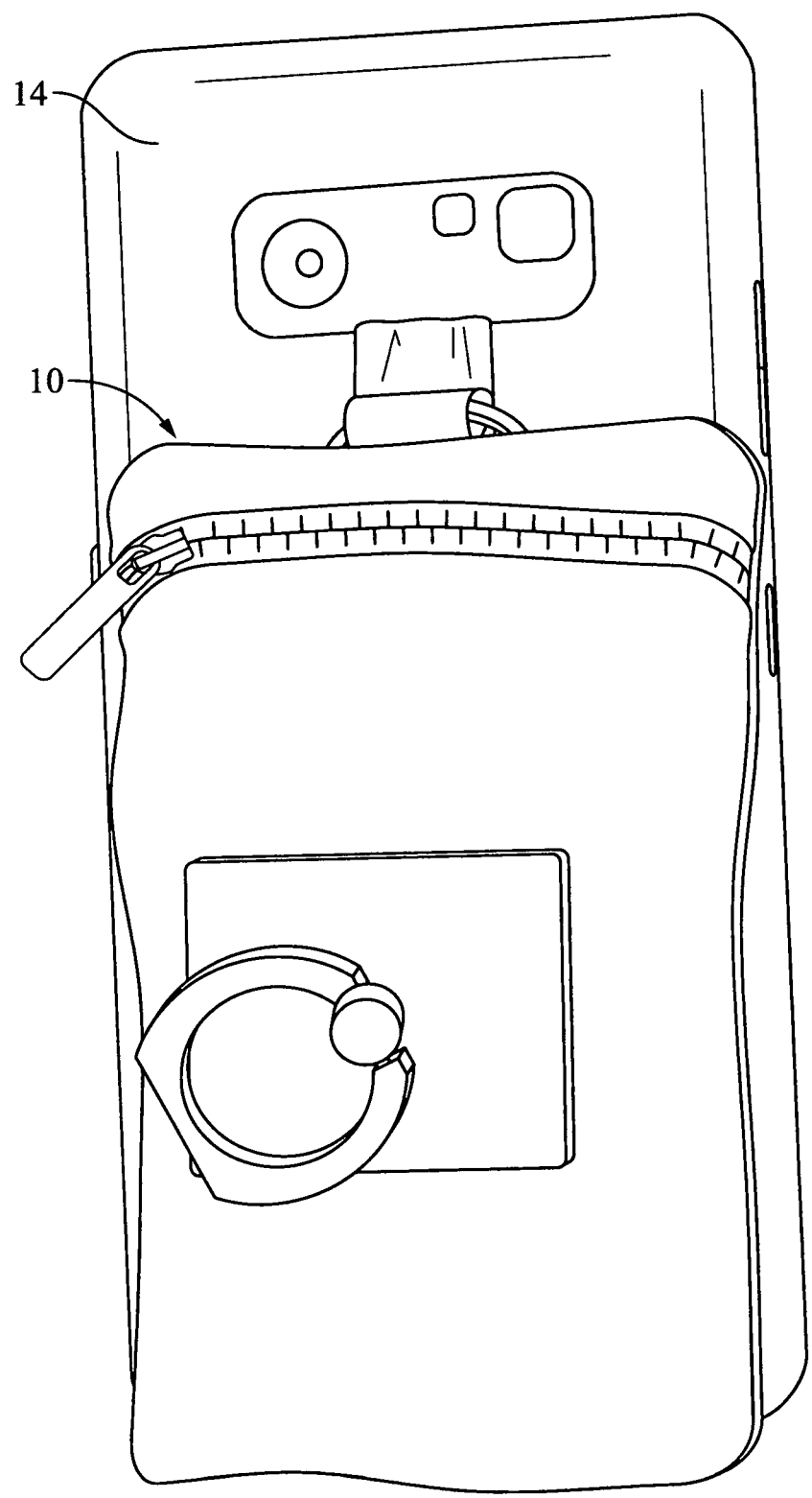
FIG. 20 is a back view of the embodiment of the invention of FIG. 19.
Figure 21:
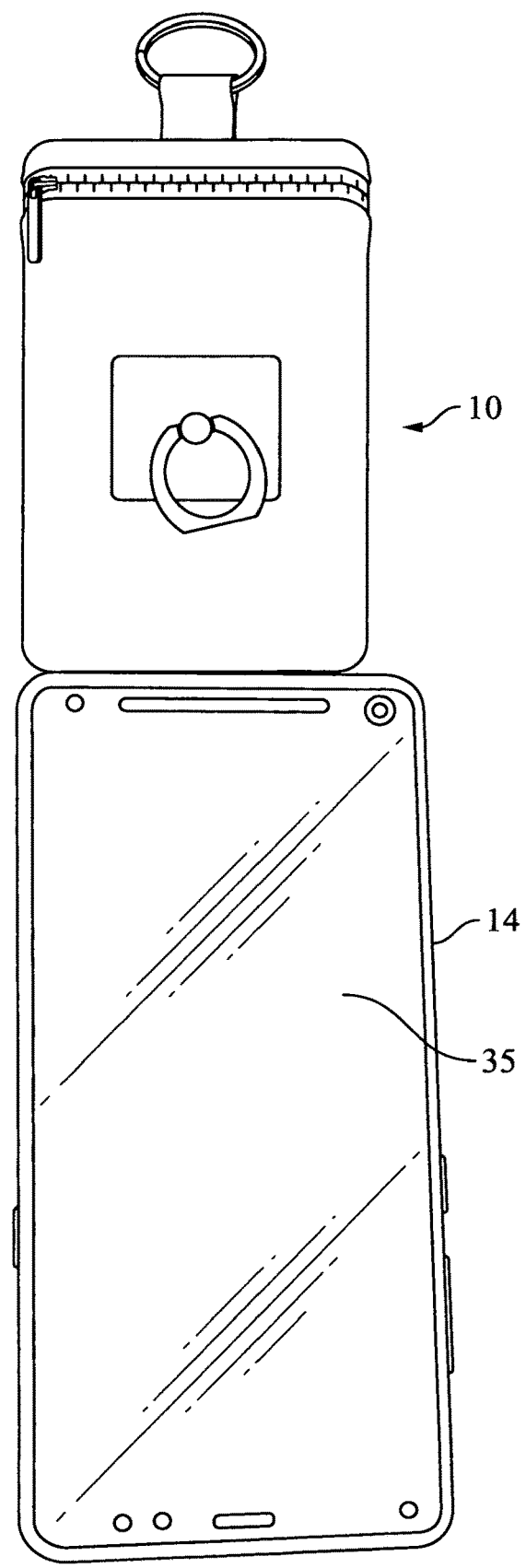
FIG. 21 is a front view of a phone in a mobile phone case with a pouch of the invention partially attached to one end of the phone case.
Figure 22:
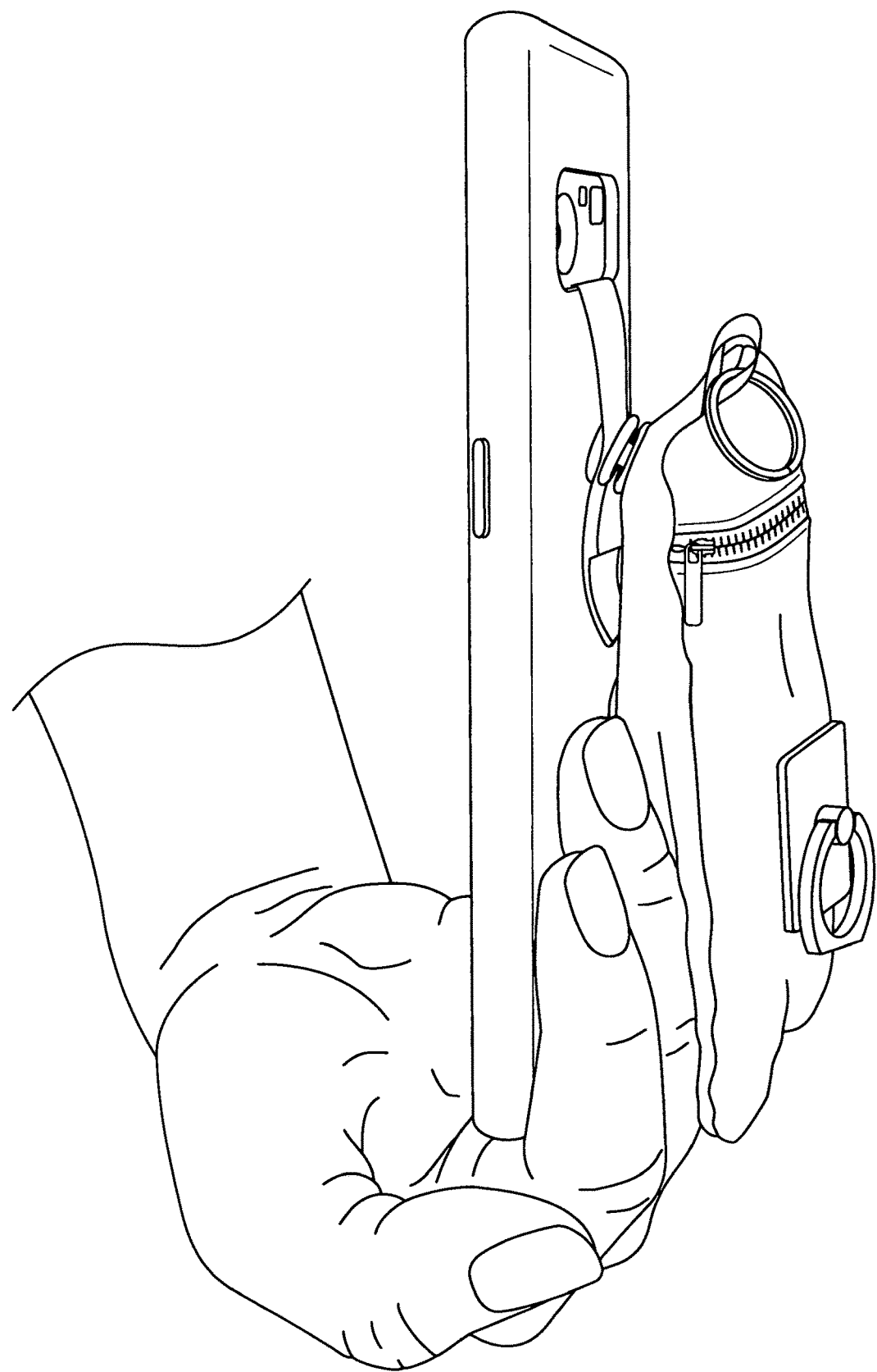
FIG. 22 is a side perspective view of the embodiment of the invention of FIGS. 7 and 21 showing there is sufficient space for fingers between the phone case and the pouch when the pouch is attached to the phone case.
Figure 23:
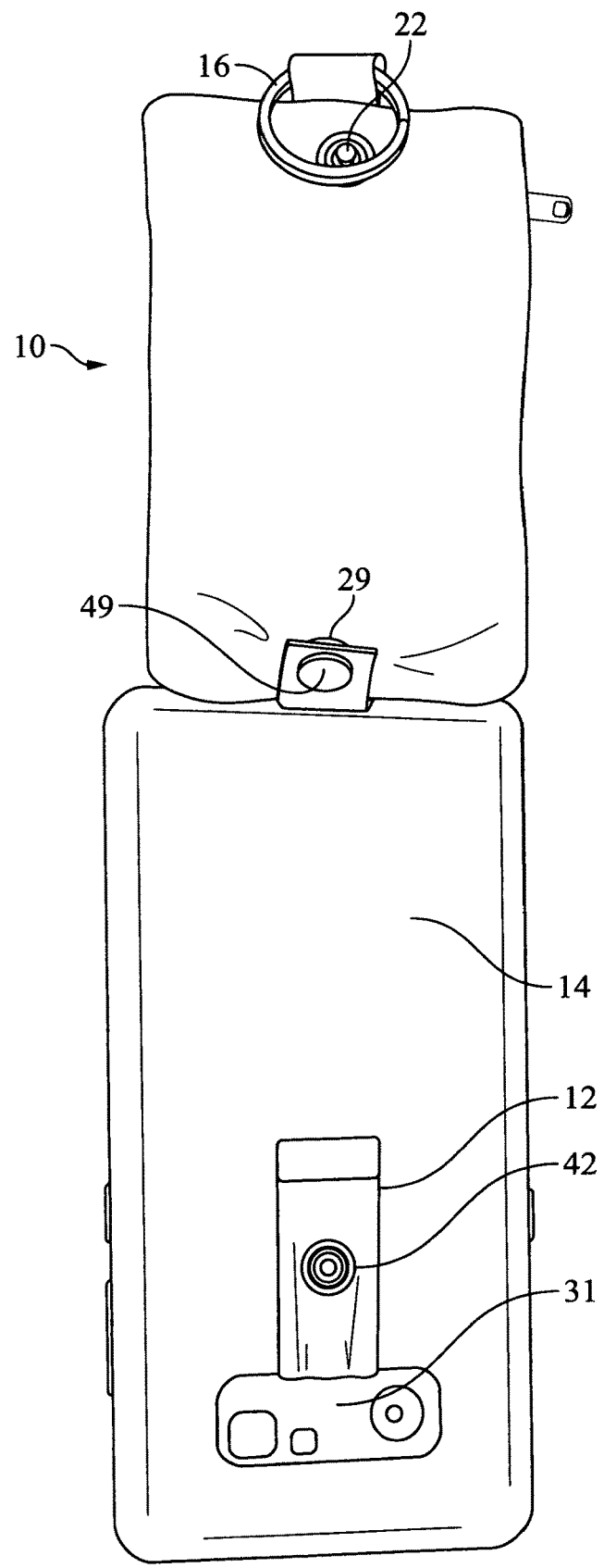
FIG. 23 is a back view of the embodiment of the invention of FIG. 22 showing the back of the pouch attached at the bottom of the phone case only, showing how the pouch can easily be opened out and removed from the camera area of the phone, while still being attached to the phone.
Figure 24:
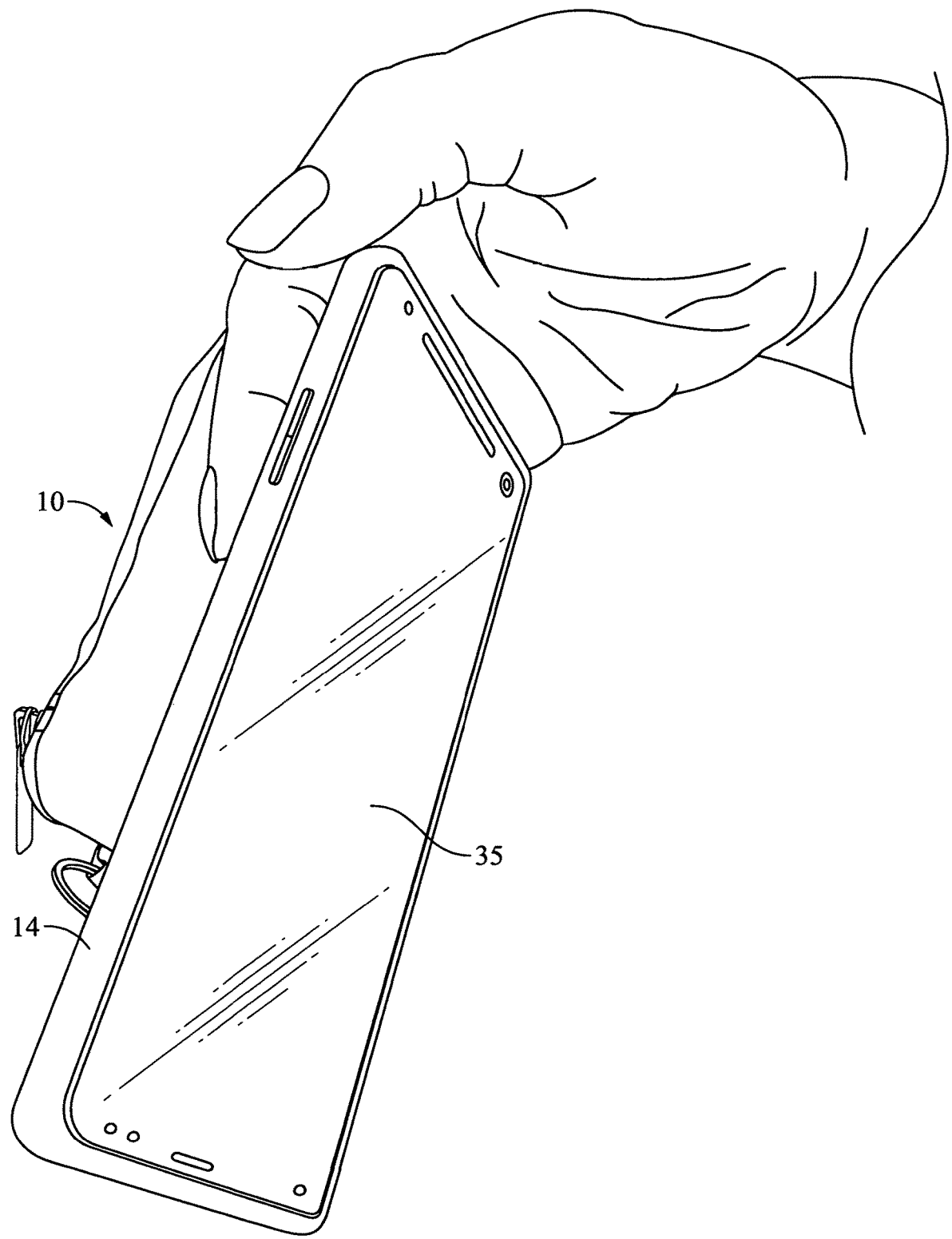
FIG. 24 is a front side perspective view of the embodiment of the invention of FIGS. 7 and 23, showing a user's fingers between the mobile phone case and the pouch, with the pouch attached to the case.
Figure 25:
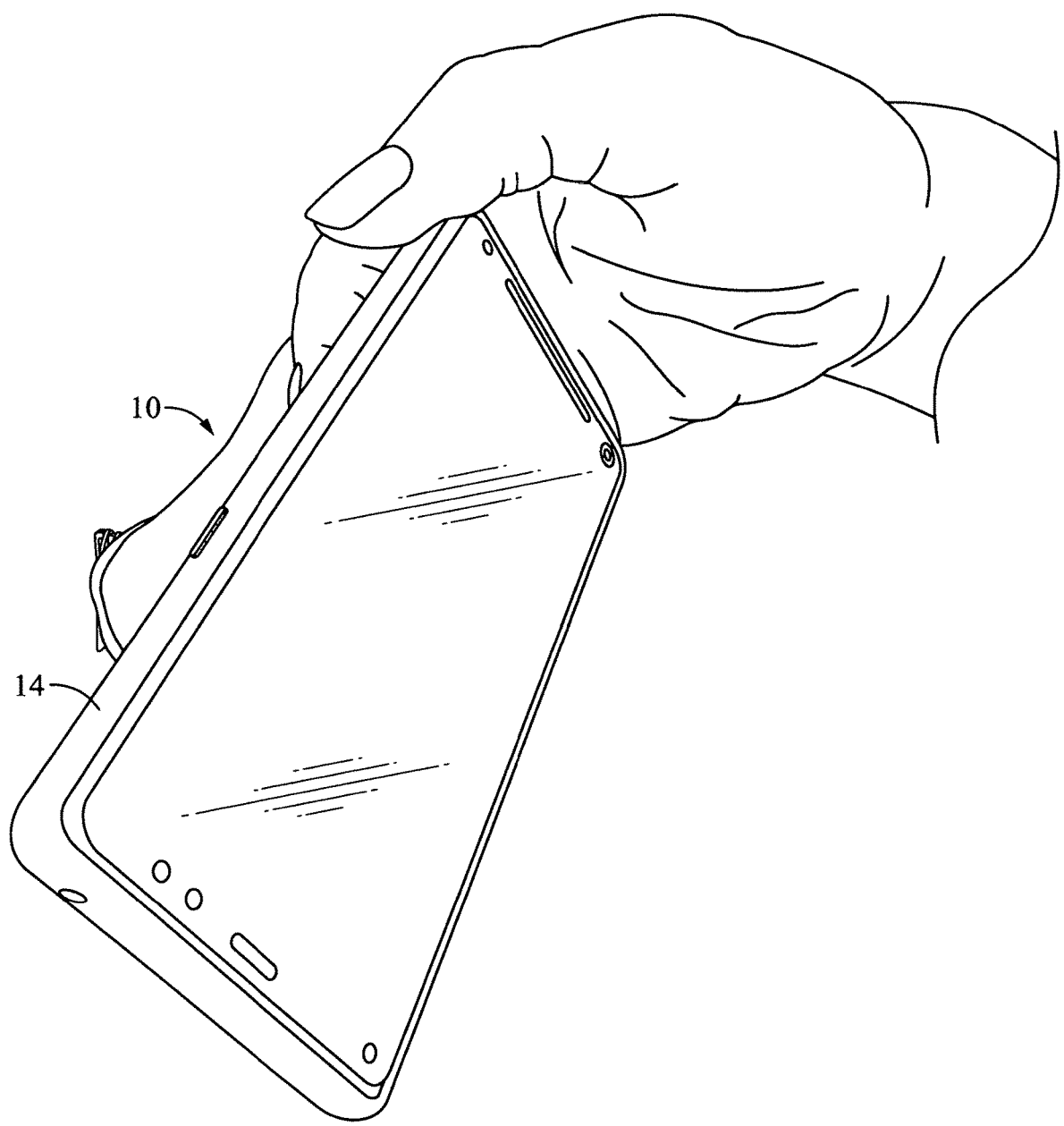
FIG. 25 is another front perspective view of the embodiment of the invention of FIG. 24.

Pouch 10 adds further utility to the phone case 14 by supporting the gripping of the phone case (and phone inside) as shown in FIGS. 19 and 20. When a user places about two to four fingers or a portion of their hand between pouch 10 and the phone case 14 when pouch 10 is attached to the phone case as shown in FIGS. 19 and 20, in gripping or holding phone case 14 and phone (not shown) inside, the case softly and comfortably adds support to the fingers and/or back of the hand to assist with gripping the phone case 14 and phone inside the phone case 14.

Figure 4:
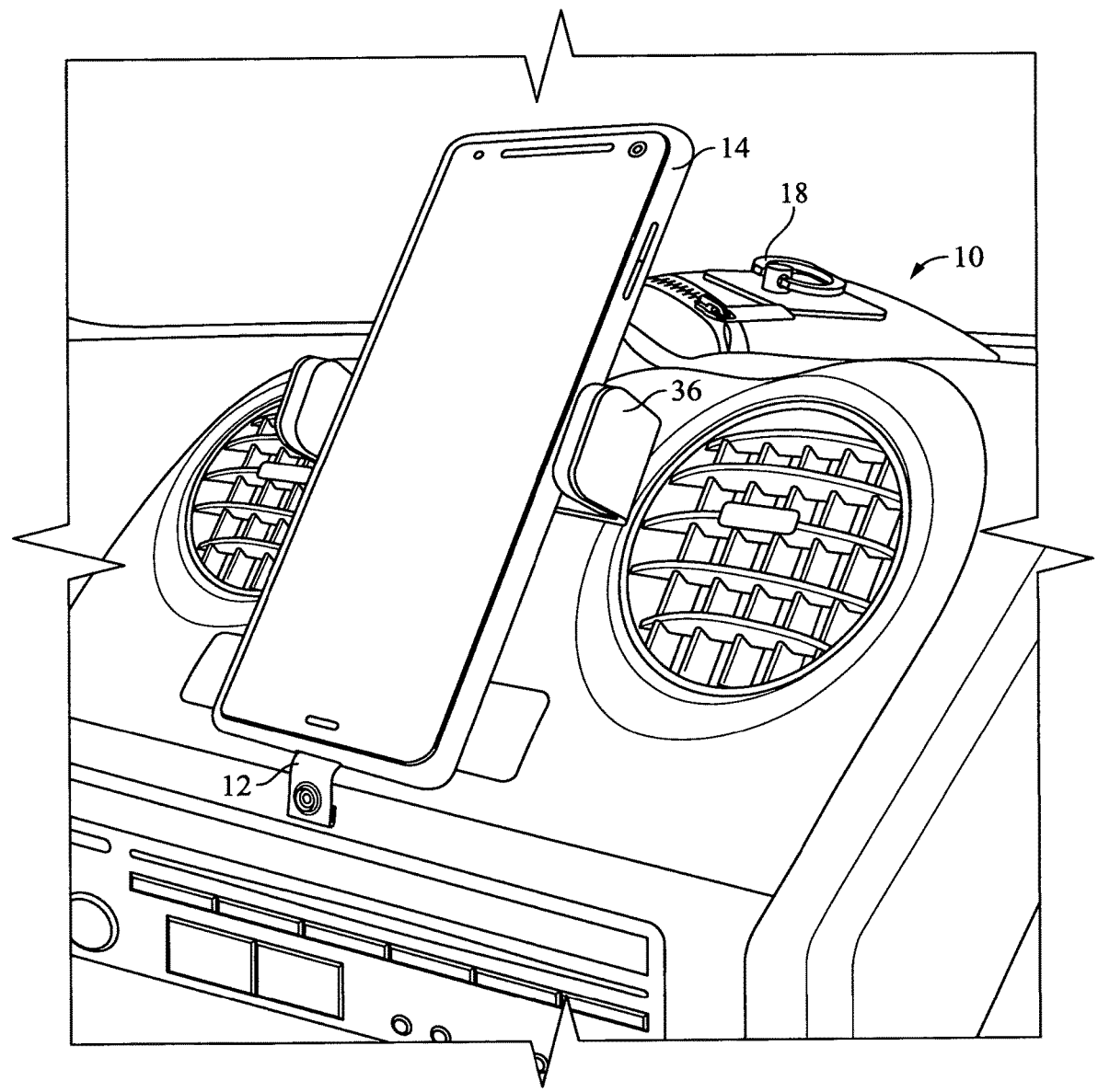
FIG. 4 is a perspective view of another embodiment of the invention, showing a phone in the mobile phone case, mounted on a car phone mount, with the pouch of the invention unsnapped at the bottom of the case but not at the top of the case, and flipped back to extend backwards from the case and over the mount so as not to interfere with the positioning of the phone on the mount.
Figure 5:
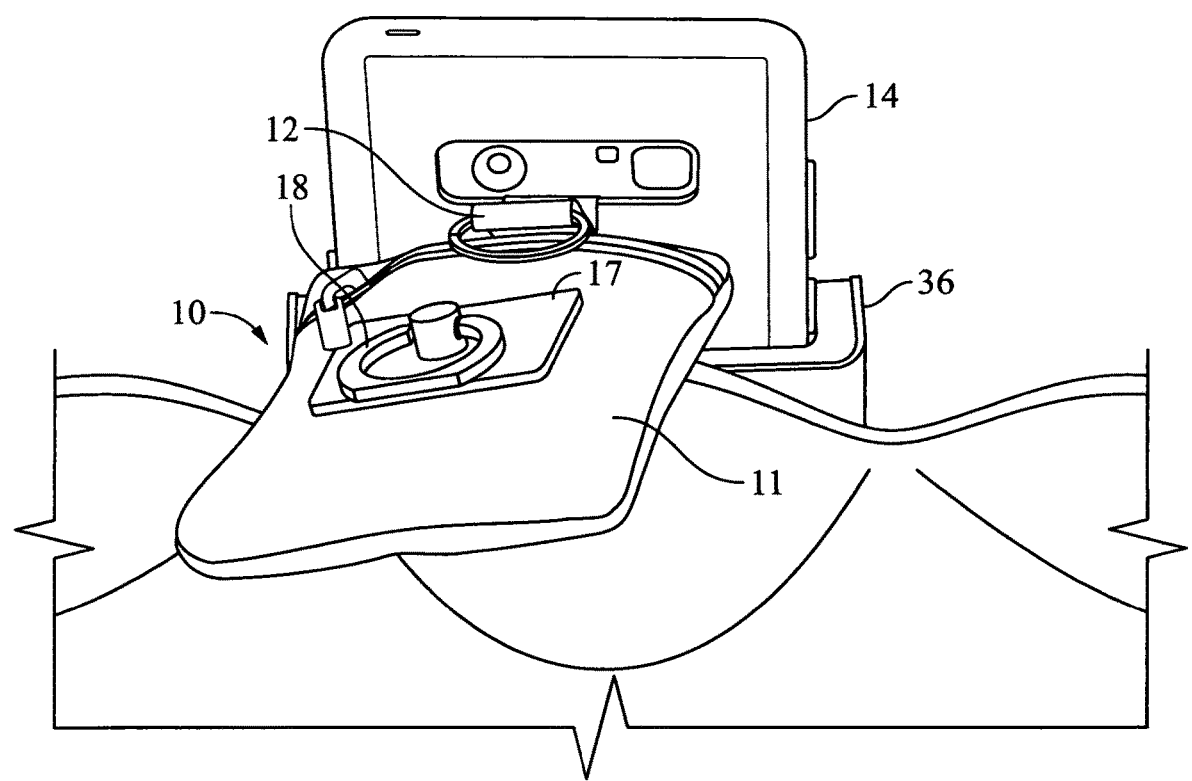
FIG. 5 provides a back view of the phone in the phone mount of FIG. 4, showing how the pouch of the invention is still connected to the top portion of the strap holding the pouch to the phone case and the invention does not interfere with the positioning of the phone in the mount.
Figure 6:
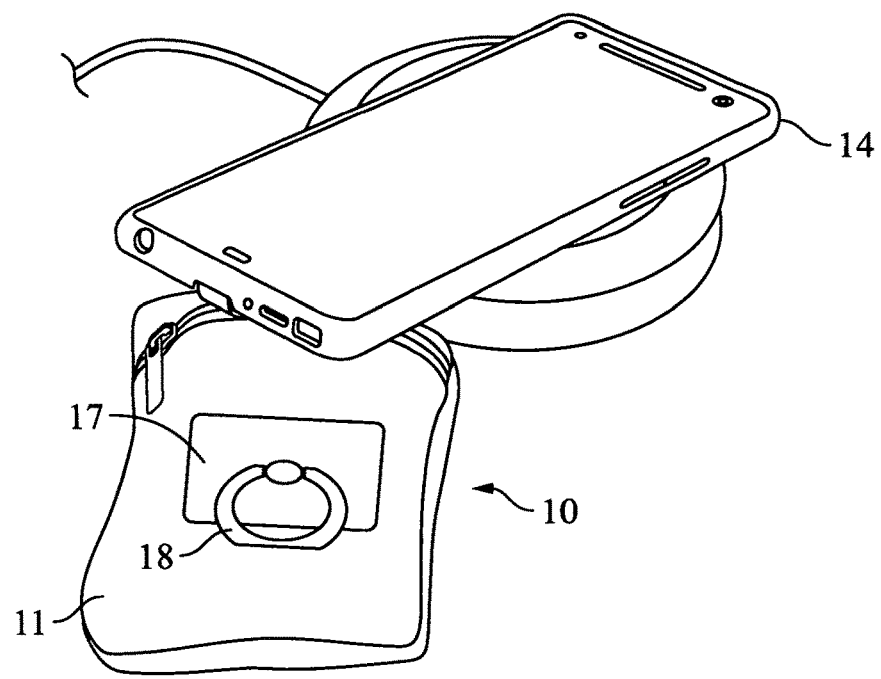
FIG. 6 shows a top perspective view of the embodiment of the invention of FIG. 4 with the pouch of the invention unsnapped at the bottom of the mobile phone case but not at the top of the case so the pouch easily stays together with the case without interfering with positioning the phone in the case for charging on the phone charger or for positioning on a speaker.
Figure 7:
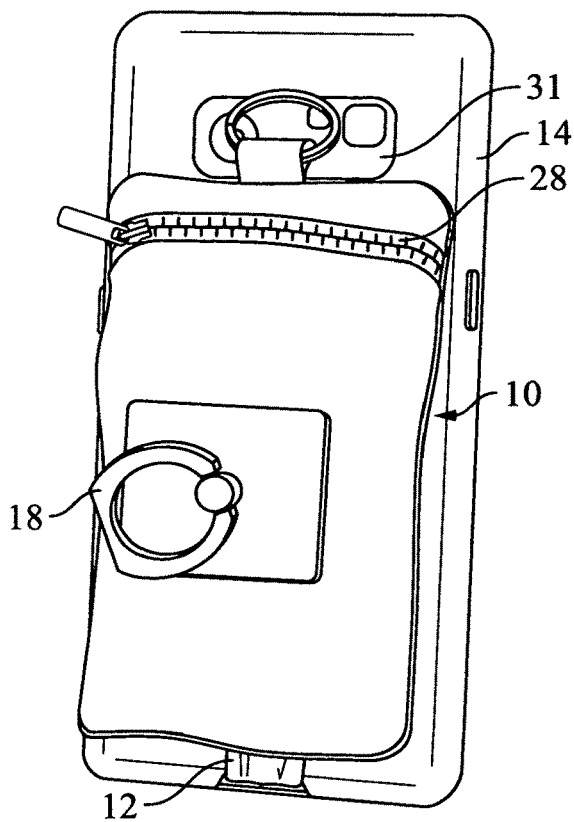
FIG. 7 shows a front perspective view of the embodiment of the invention of FIG. 4, showing an additional auxillary ring positioned on the middle of the front of the pouch that is particularly suited for attaching items to the pouch.
Figure 8:
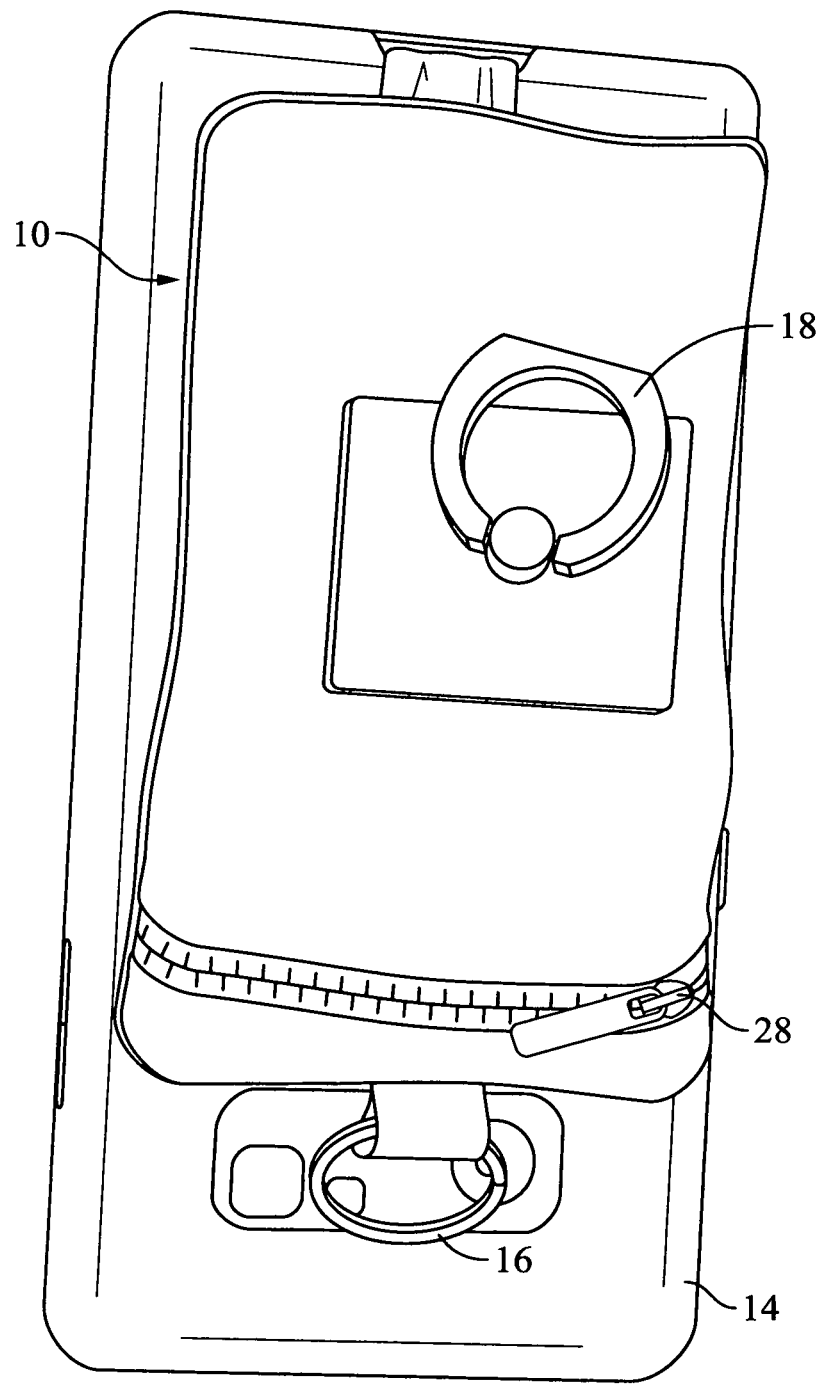
FIG. 8 shows a front view of the embodiment of the invention of FIG. 7, positioned in the opposite direction from the view of FIG. 7.
Figure 26:
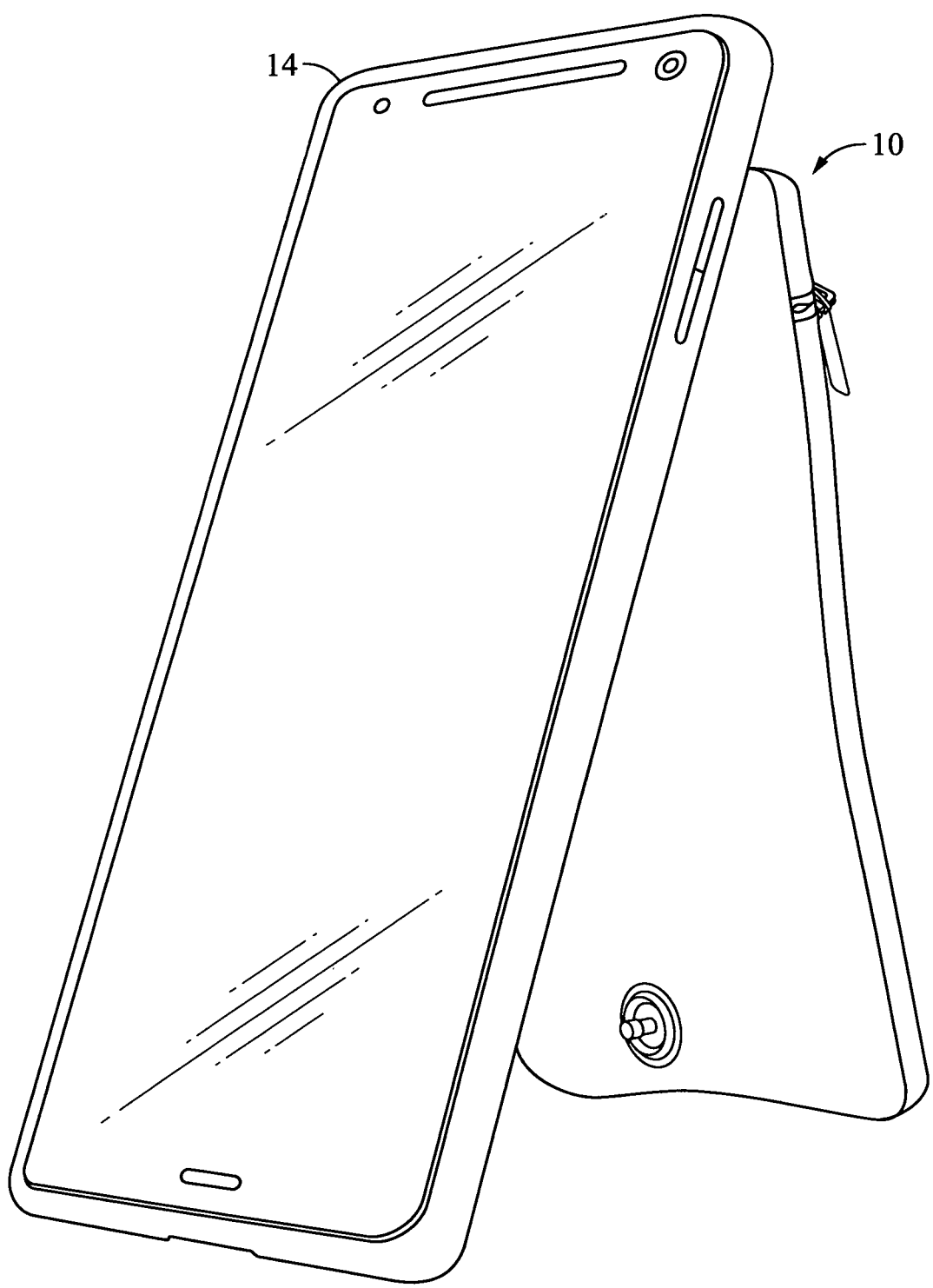
FIG. 26 is a side perspective view of an embodiment of the invention where the pouch is attached only at its top, near the top middle of the mobile phone case beneath the camera window, and the pouch is extended out from the phone case at the base of the phone case so that the pouch supports the phone in a more vertical or quasi-vertical or upright position.

Still further, partial detachment of pouch 10 as shown in FIGS. 4-6 and in FIG. 26 adds further utility to the phone case 14. That is, pouch 10 can by positioned as shown in FIG. 26 to help support or prop the phone inside the case in a vertical or semi- or quasi-vertical position for viewing and use, which will be further discussed below. Pouch 10 also allows ease of mounting or does not interfere with the mounting of a phone in the phone case 14 on a car mount 36 as shown in FIGS. 4 and 5 or on a phone charger as shown in FIG. 6.

An advantage of the invention is that it can be included with a new phone case, or added to an existing one. That is, the invention can be considered "part of" a phone case or can be provided in a kit for adapting an existing phone case, as an "after-market" add-on.

The body 20 of pouch 10 is preferably comprised of soft fabric or cloth which in some embodiments is also padded or quilted. A wide range of fabrics can be used, including for non-limiting example, cloth materials comprising cotton, polyester, cotton and synthetic blends, leather, synthetic leather, soft plastics, canvas and hemp. Items can be secured in pouch 10 by a zipper 28 as shown in the Figures. Another closure such as a snap, hook and loop closure, button or tie (not shown) might be used instead of (as a substitute for) zipper 28, but a zipper is generally preferred as it can securely close the entire case. A hook and loop fastener or closer preferably running the entire width of the case like zipper 28 could serve the same secure function afforded by zipper 28. A hook and loop closer (not shown) could be sewn into the pouch 10 like zipper 28, or could be affixed with an adhesive or glue. A fabric envelope or flap style closure could alternatively be used and would be more economical for manufacturing of pouch 10 but would provide a less secure closure than the other alternatives.

Pouch 10 can be made as follows: For the front side 11, a smaller top piece 23 and a larger lower piece 24 of fabric are sewn to a zipper 28. Back piece 27 is sewn onto the smaller top piece 23 and the larger lower piece 24 by putting the "exterior" or "front" (also called the "right") side of the front side 11 piece (comprising the smaller top piece 23 and the larger lower piece 24 sewn to zipper 28) to the "exterior" or "front" (also called the "right") side of the back piece 27, and sewing them together. Pouch 10 is then turned inside out so that the seams are on the inside and the "exterior" side of the pieces is on the outside of the pouch 10. In the embodiments shown in the Figures, a male side 29 of a snap or male snap 29 (or other fastener) is attached to the back of the pouch at the center bottom of the pouch about one-half inch from the bottom seam. Another male side 22 of a snap or male snap 22 (or other fastener) is attached to the center top of the pouch, preferably above (or in line with) snap 29.

Figure 9:
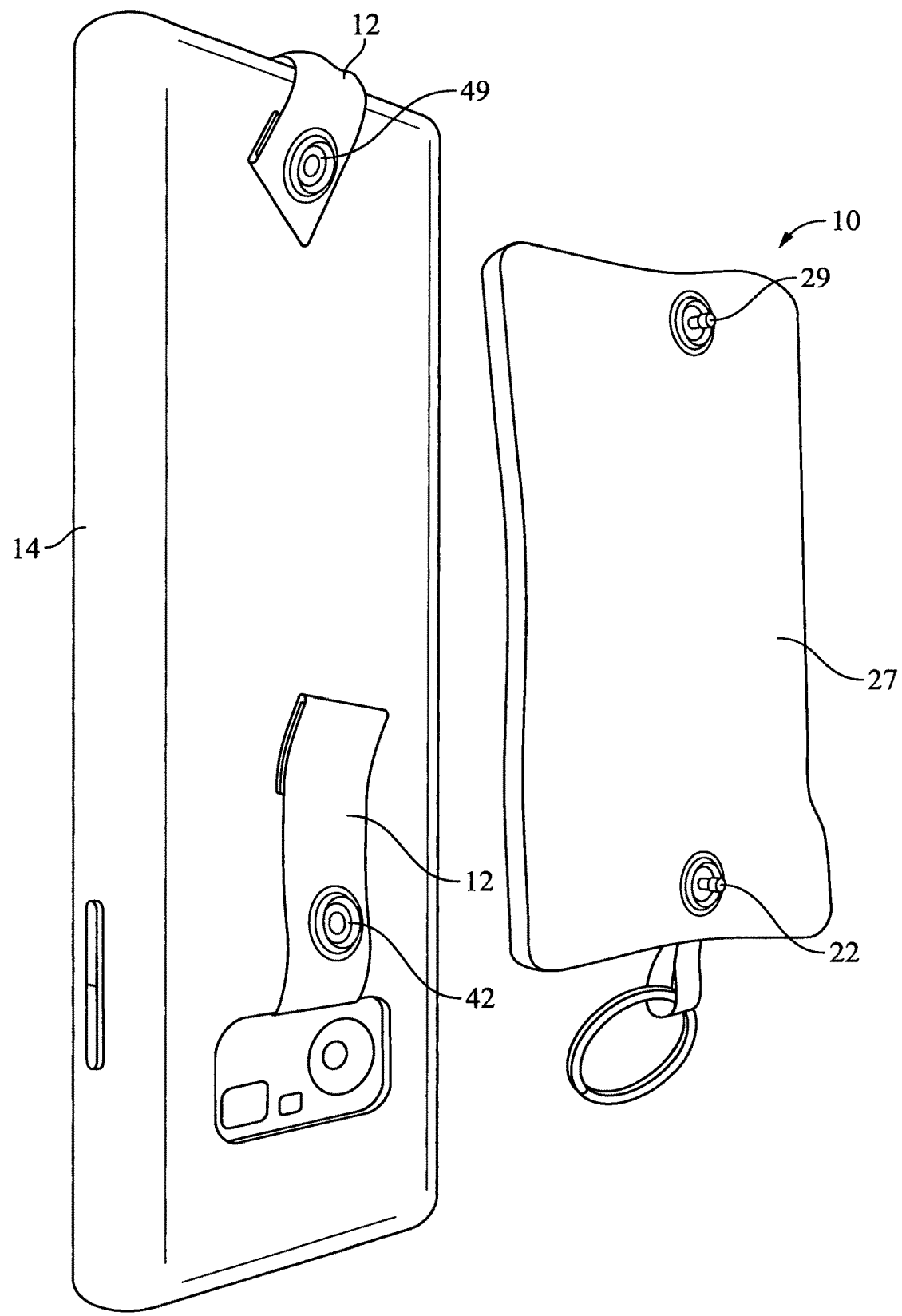
FIG. 9 shows a side perspective of the apparatus of FIG. 7, with the pouch unsnapped from the strap that extends through the phone case.
Figure 10:
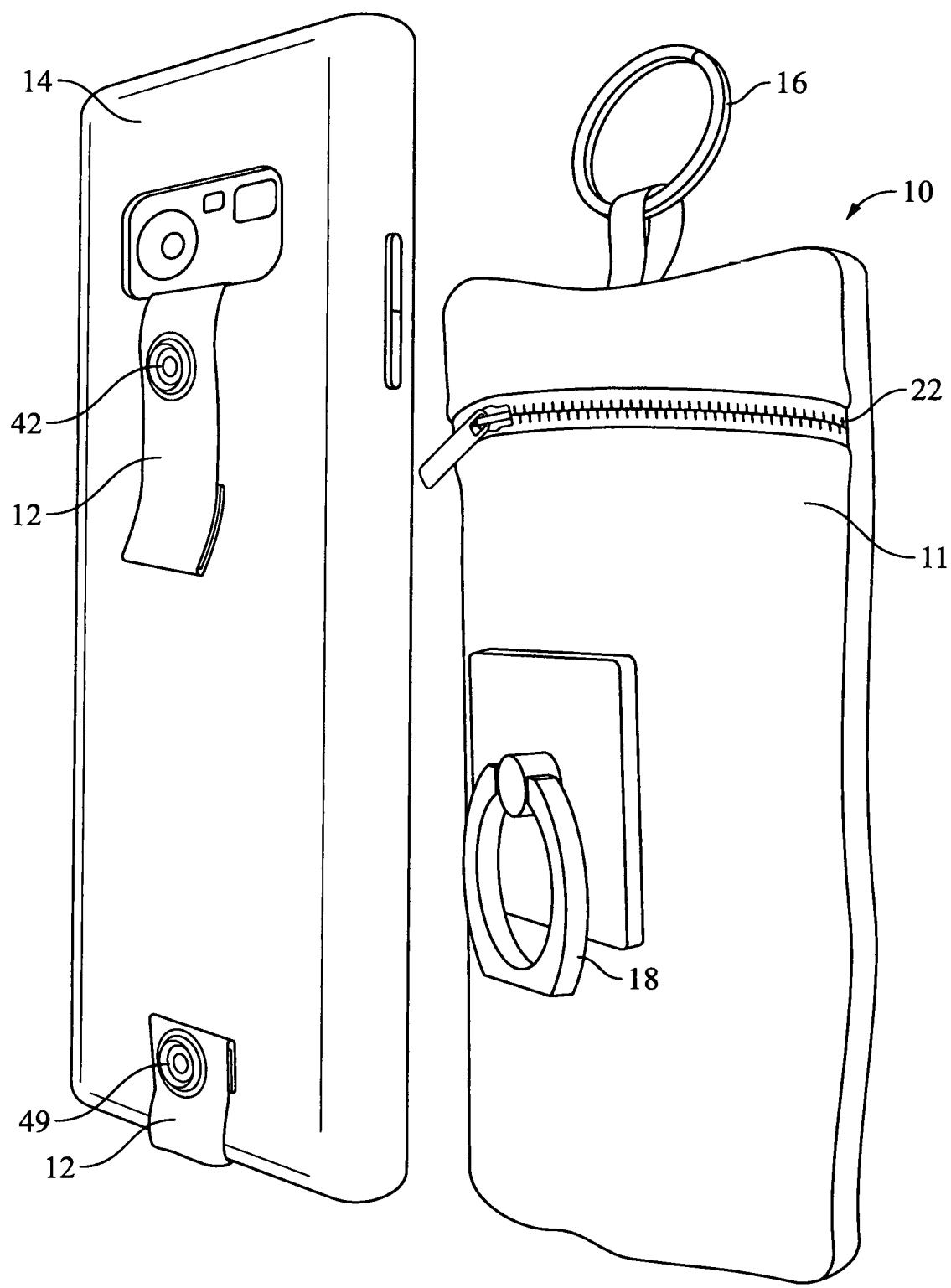
FIG. 10 shows another side perspective view of the embodiment of the invention of FIG. 7 showing the mobile phone case and the pouch separated and laying side by side.
Figure 11:
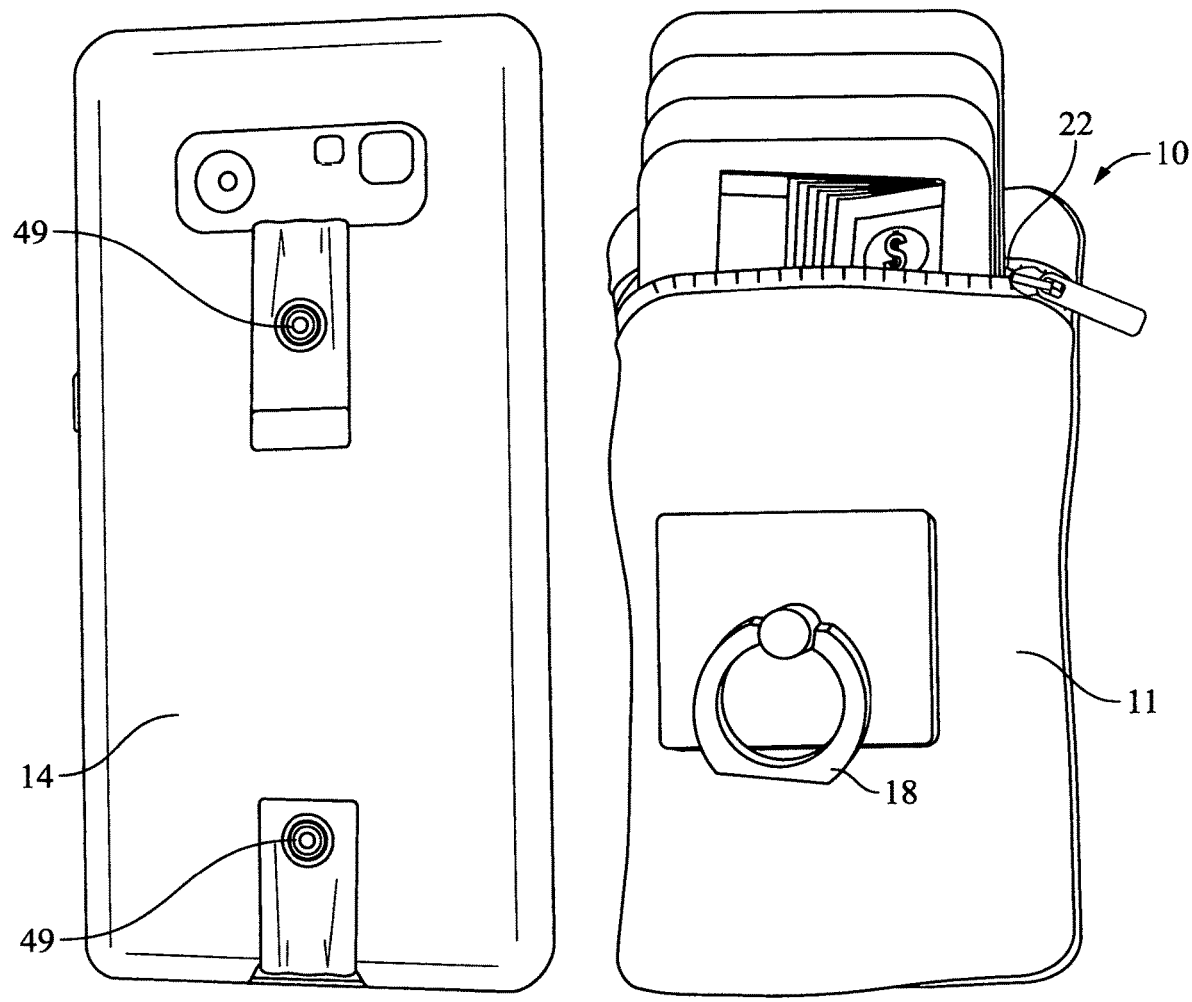
FIG. 11 shows a front view of the embodiment of the invention of FIG. 7 with the pouch unsnapped from the strap as shown in FIG. 9, but with the zipper fastener opened to show the contents of the pouch protruding from the pouch through the zippered opening to show example contents that the pouch of the invention can hold.
Figure 12:
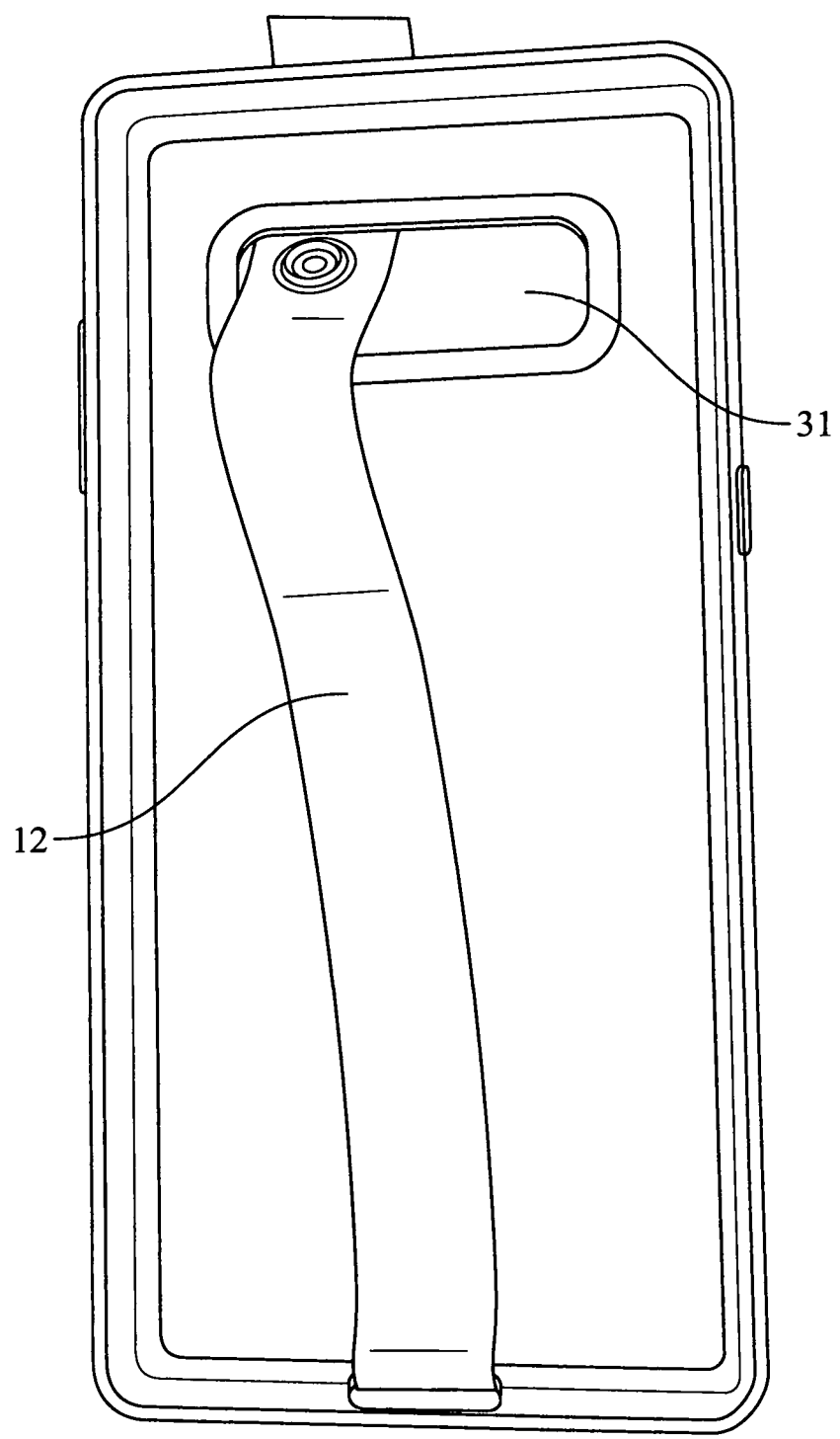
FIG. 12 shows the back or inside of the mobile phone case of the invention, with the phone removed from the phone case and the pouch removed from the phone case. The strap of the invention is shown fitting through the camera window or hole in the phone case.
Figure 13:
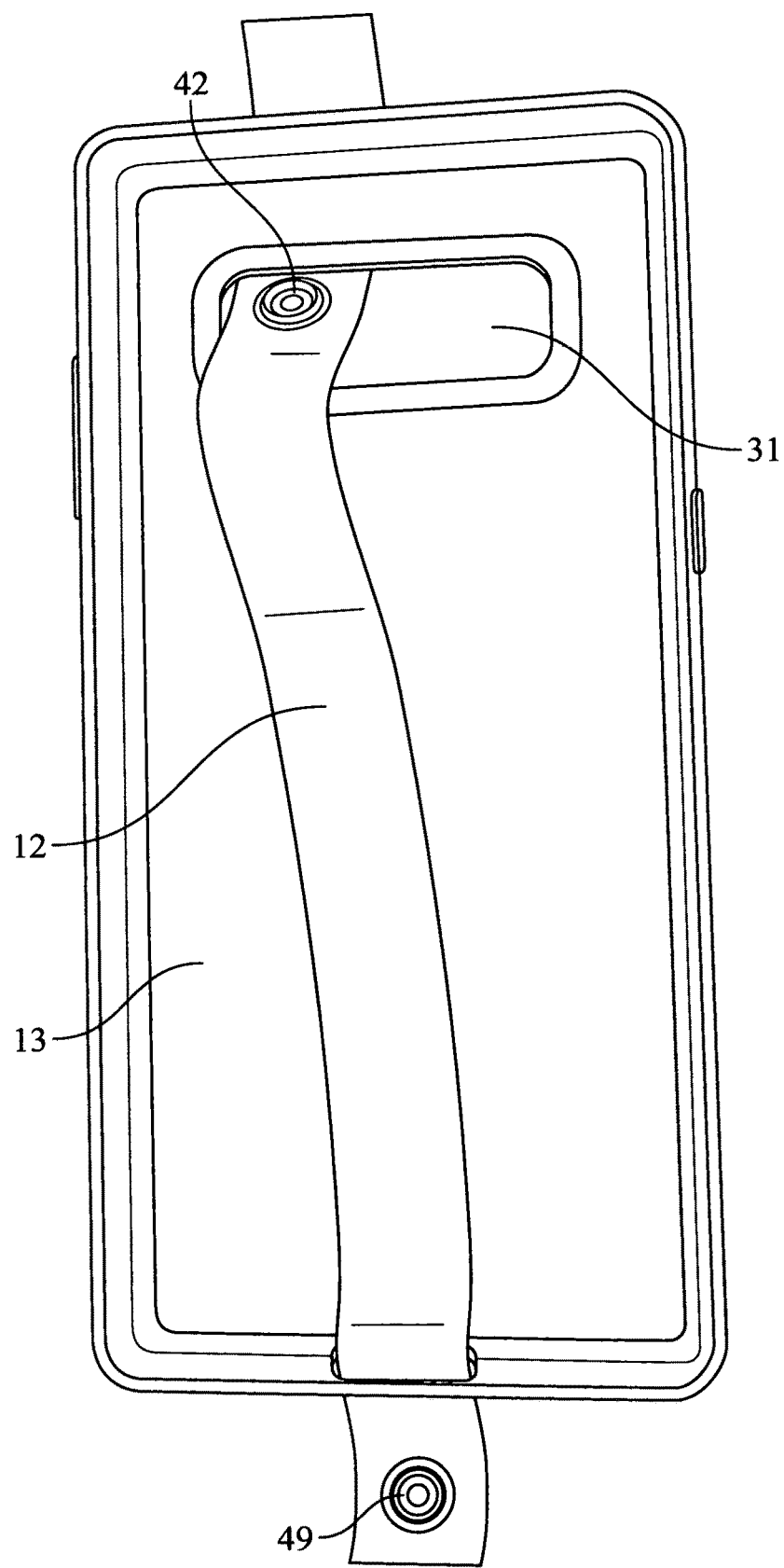
FIG. 13 is another view of the inside of the phone case of FIG. 12, showing both ends of the strap for securing the pouch to the case, with female snap fasteners at both ends of the strap.
Figure 14:
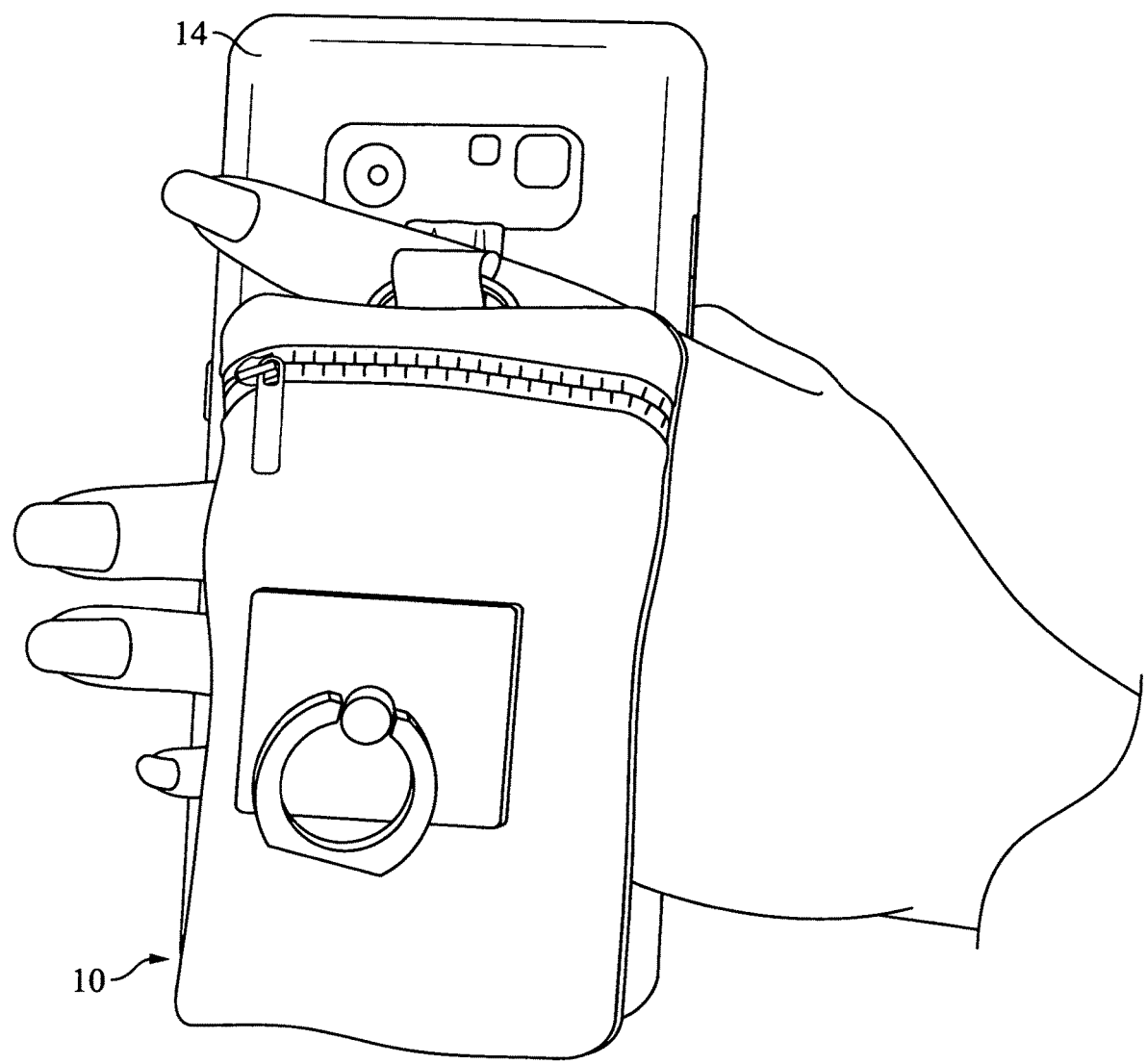
FIG. 14 is a front view of the embodiment of the invention of FIG. 7 with the pouch attached to a mobile phone case with a mobile phone inside the case. This view shows the pouch extending outward from the phone to enable a person to insert his or her fingers or hand between the pouch and the back of the phone, to better hold the phone while talking or texting.
Figure 15:
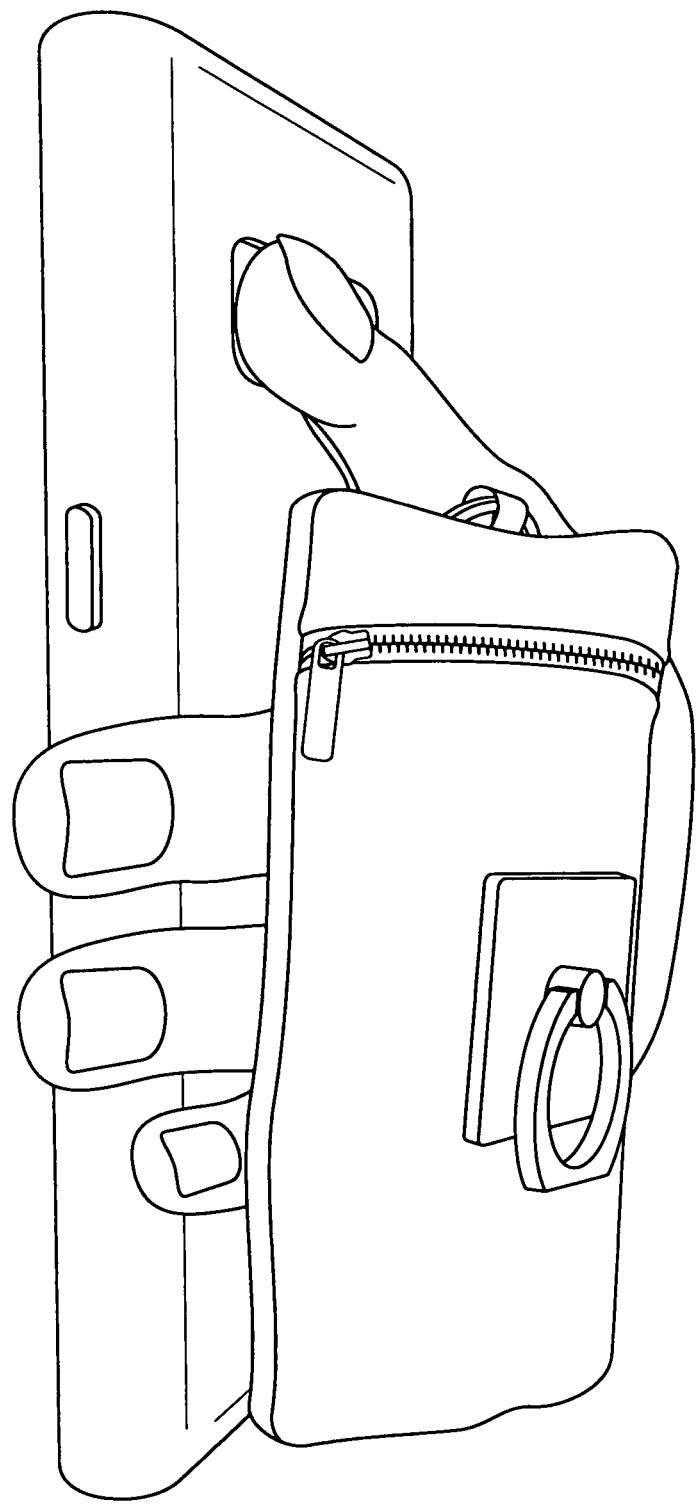
FIG. 15 is a side perspective view of the embodiment of the invention shown in FIGS. 7 and 14 with the user's hand positioned between the phone and the pouch.
Figure 16:
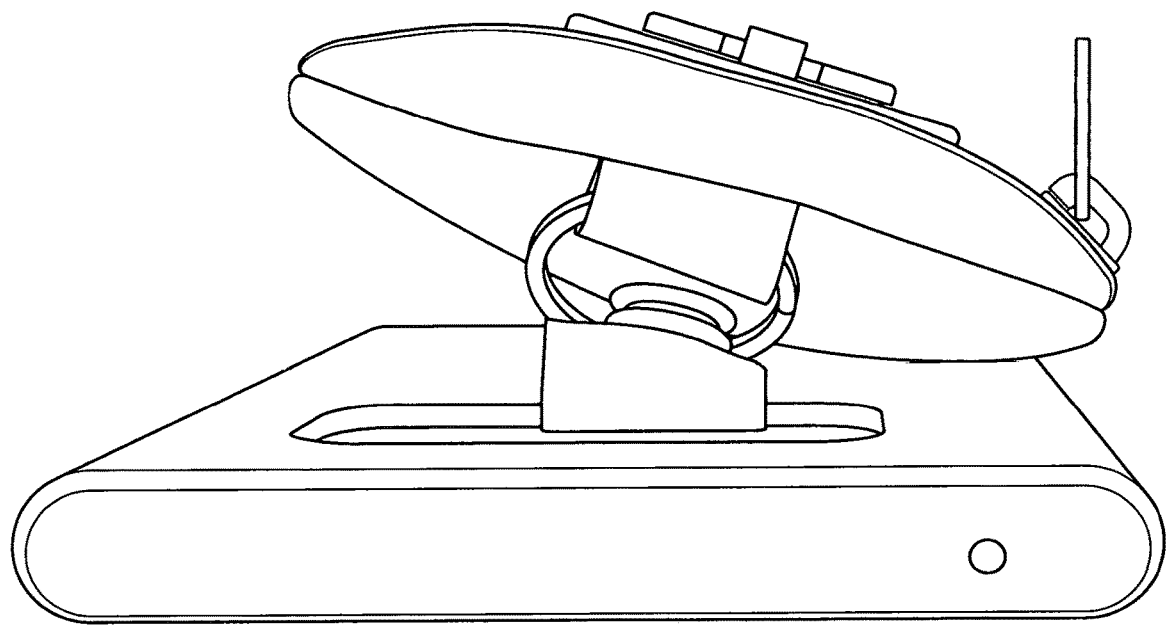
FIG. 16 is a top view of the pouch of the invention attached to a mobile phone case.
Figure 17:
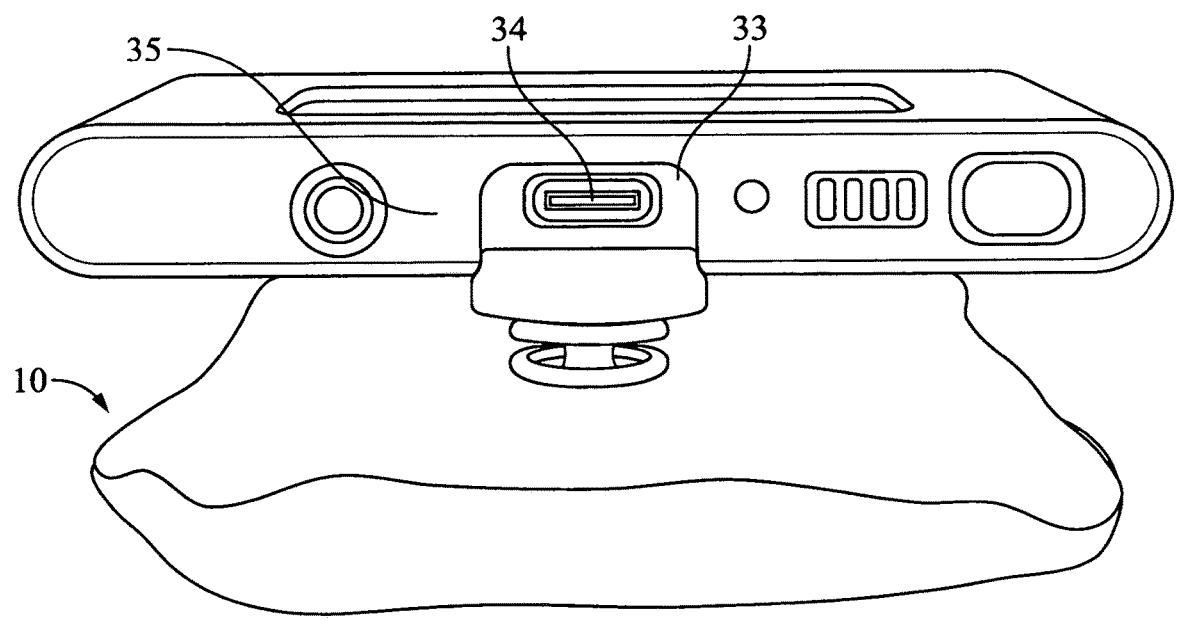
FIG. 17 is a bottom view of the pouch of the invention attached to a mobile phone case holding a mobile phone.
Figure 18:
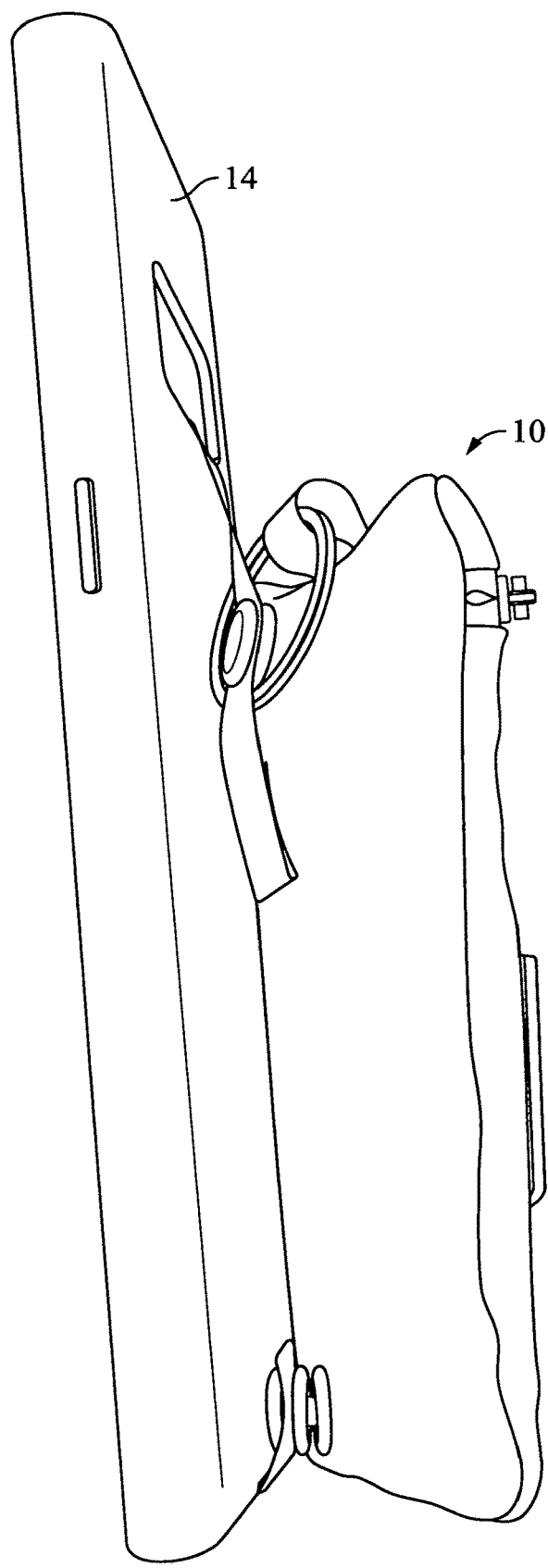
FIG. 18 is a side view of the pouch of the invention attached to a mobile phone case, with the pouch slightly turned out to show the snap connectors connecting the pouch to the mobile phone case.

For use, pouch 10 is removably attached to mobile phone case 14 as illustrated in the Figures. In one embodiment of the invention, as shown in FIGS. 1-3, 9, 10, 12, 13 and 14, pouch 10 of the invention is held in place on the mobile phone case 14 via a strap 12. Strap 12 is a ribbon type strap that is flexible so as to thread along the backside 13 of the mobile phone case 14 through and out the camera window 31 and the cut-out 33 as shown in FIGS. 1 and 13. Strap 12 is also strong so as to be able to support pouch 10. [Cut-out 33 of mobile phone case 14 allows for direct access to the phone charging port 34.] Strap 12 is also thin so as not to interfere with the phone camera when the strap 12 is placed through the phone camera window 31. Strap 12 has on its ends the female sides 42 and 49 of snaps (or female snaps 42 and 49) to correspond respectively to the male snaps 22 and 29 on pouch 12, as shown in FIGS. 1, 9, and 13. Strap 12 should preferably be no more than about five-eighths of an inch wide and long enough to fit through and span a length to reach from the bottom fastener 22 of the pouch through the cut-out 33 or charging hole up the inside (or backside 13) of the phone case 14 through the camera window 31 or camera hole and down to the center fastener 29 of pouch 10. Although the center fastener 29 is shown in the Figures in the center of pouch 10, it could alternatively be placed more to the side of the pouch, such as on the right side when the camera window in the phone case is on the top, left side of the phone case rather than in the top middle of the case.

Although the fasteners that are shown in the drawings are snaps, other type fasteners could be used in the invention, such as for non-limiting example, hook and loop fasteners, buttons, reusable glue or sticky tape, and clips.

Figure 27:
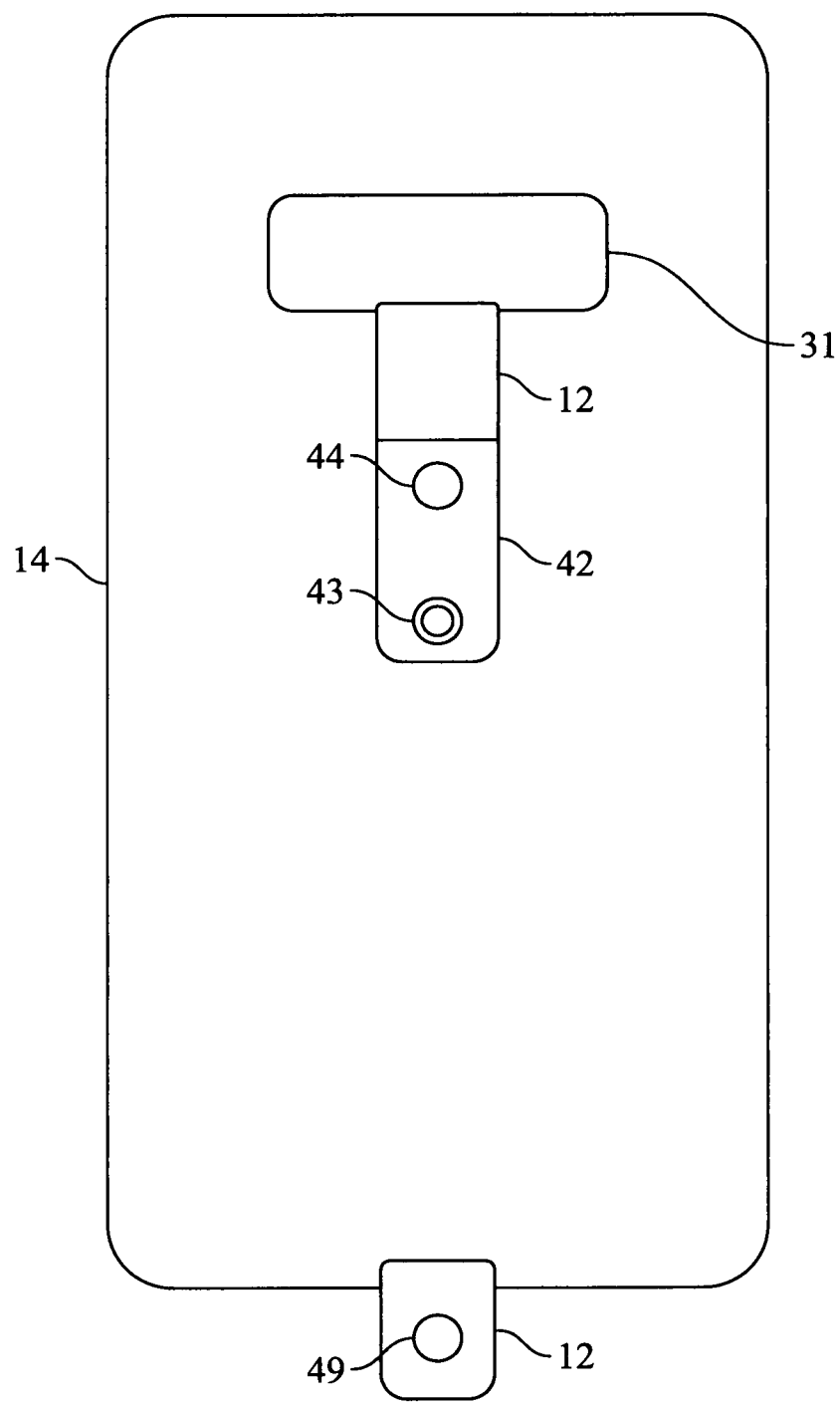
FIG. 27 shows an embodiment of the invention with an extender in use on the strap to hold the pouch to the phone case.

In an alternative embodiment, an extender strap 42 is included as shown in FIG. 27. This strap has a fastener on each end and is preferably the same width and material as strap 12. If the fastener is a snap, then one end has a female snap 43 and one end has a male snap 44, so that the extender strap 42 can be attached at its end with the male snap 44 to the female portion of a snap fastener an the end of strap 12 near the camera window and the female snap 43 on the extender strap 42 can be attached to snap 22 on pouch 14, as shown in FIGS. 9, 23, 27 and 28. This strap can be useful in adjusting strap 12 for different sized phone cases, as well as for providing more room for larger fingers and hand in gripping the phone case with fingers and hand between the phone case and the pouch, as shown in FIGS. 19 and 20.

The above described embodiment for removably attaching pouch 10 to mobile phone case 14, using strap 12, is an embodiment of the present invention that lends itself well to both use with new phone cases, and as an "add-on" for phone cases already in use by consumers.

A kit can be provided including a pouch 14 as described above, and a strap 12 as described above and optionally one or more extender straps 42 as described above for flexibility. Drawings and/or text instructions enable a purchaser to easily apply the strap to the mobile case and the pouch to the strap.

Figure 28:
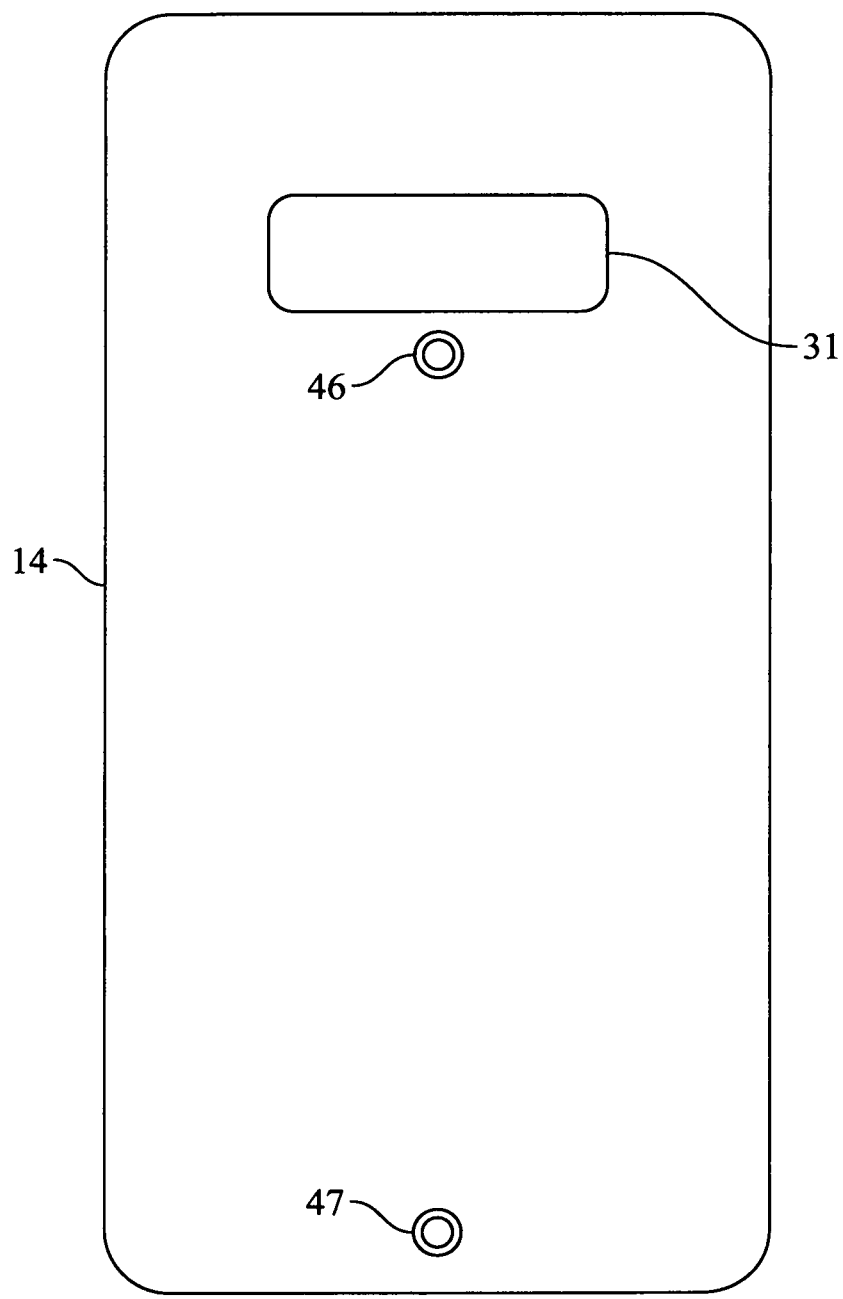
FIG. 28 shows an embodiment of the invention where fasteners, snaps in this embodiment, are used on the mobile phone case instead of a strap to hold the pouch to the phone case.

In a further alternative embodiment of the invention, as shown in FIG. 28, pouch 10 of the invention is held in place on the mobile phone case 14 via fasteners directly attached to the body of the mobile phone case 14. Thus, a female snap 46, or other fastener, is positioned near the top middle of the phone case 14 below or to the right of the camera window 31, and a female snap 47, or other fastener, is positioned at the base of the phone case 14. Preferably, such positioning of the snaps on the phone case will correspond to the positioning of the snaps on the pouch so that the male snaps 22 and 29 on pouch 10, can attach directly and respectively to snaps 46 and 47 on the phone case. An extender strap 42 as discussed above could be used as discussed above to enable a better fit of the snaps on the phone case with the snaps on the pouch. That is, extender strap 42 could be attached between male snap 22 on the pouch and female snap 46 on the phone case. More specifically, male snap 44 of extender strap 42 could be attached to female snap 46 in the phone case 14 of FIG. 28 for attachment of the pouch 10 via male snap 22, and male snap 29 of the pouch attaching to female snap 47 of the case.

In FIG. 9, pouch 10 of the invention is removed from the mobile phone case 14. In this FIG. 1, snaps 22 and 27 are not seen as they are on the back of pouch 14, as can be seen in lesser detail in FIGS. 3, 17-19, and 22.

FIGS. 1-3, 5, 6-10, 14-16, 29-24 show an embodiment with optional rings 16 and 18 respectively on the top end and front side 11 of pouch 14. Such rings 16 and 18 are optional auxillary attachments to pouch 10 and can be used to hang the pouch 11 alone or attached to the mobile phone case 14 (whether or not the phone case is holding a phone). Ring 18 is also particularly suited for attaching items to the pouch 11.

While preferred embodiments of the present disclosure have been described, it should be understood that various changes, adaptations and modifications can be made therein without departing from the spirit of the invention as claimed.

I claim:

1. An attachable and removable pouch, for use on a mobile phone case having a camera window near the top of the back of the case and a cutout near the bottom of the case for access to a phone's charging port, the pouch for holding personal items, credit cards, identification cards, money and/or keys, for supporting or propping the phone in an upright or quasi- or semi-upright position on a flat surface or on a car mount or wireless charger, and for enhancing a hand grip of the phone case, and the pouch comprising:
    (a) a pouch body comprising a first piece and a second piece of fabric sewn to a first connector and/or first closer to comprise the front of the pouch and a third piece of fabric sewn to the first piece and the second piece of fabric to form with the first and second piece of fabric a rectangular shaped body sized in depth to hold at least two credit cards and in height and width to be smaller than the height and width of the phone case;
    (b) a second connector positioned on the back and near the top of the pouch body and a third connector positioned on the back and near the bottom of the pouch body, with the second connector and the third connector spaced apart on the pouch body at the distance of the width of at least about two to four fingers of an adult's hand, wherein the second connector comprises the male part of a first snap or the hook part of a first hoop and loop connector or closer and the third connector comprises the male part of a second snap or the hook part of a second hoop and loop connector;
    (c) a first ribbon type strap about ⅜ inch to about 1 inch in width and having a first end and a second end, and sufficient length to extend along the back of the inside of the phone case from the camera window to the cutout so that first end of the strap can extend out said camera window to the exterior of the back of the phone case and the second end of the strap can extend out said cutout to the exterior of the back of the phone case, wherein the first end of the first ribbon type strap comprises the female part of a third snap or the loop part of a third hoop and loop connector and the second end of the first ribbon type strap comprises the female part of a fourth snap or the loop part of a fourth hoop and loop connector;
    (d) at least one optional second ribbon type extender strap less than about one-half inch to about three inches long and having a width about the same as the first ribbon type strap and having on a first end a male part of a fifth snap or the hook part of a fifth hoop and loop connector and having on a second end a female part of a sixth snap or the loop or pile part of a sixth hoop and loop connector, wherein in use the male part of the first snap or hook and loop connector connects to the female part of the third snap or hook and loop connector or to the female part of the sixth snap or hook and loop connector and the male part of the second snap or hook and loop connector connects to the female part of the fourth snap or hook and loop connector or to the female part of the fifth snap or hook and loop connector;
    wherein in use, the pouch softly and comfortably adds support to the fingers and/or hand during gripping of the phone, and
    wherein the pouch is partially detachable for placement for supporting or propping the phone in an upright or quasi- or semi-upright position on a flat surface or on a car mount or wireless charger.

2. The pouch of claim 1 wherein the fabric is quilted.

3. A kit comprising the pouch of claim 1 and instructions for applying said pouch to a mobile phone case.

4. A mobile phone case having the pouch of claim 1 attached thereto.

* * * * *